United States Patent
Wakai et al.

(10) Patent No.: US 6,768,990 B2
(45) Date of Patent: Jul. 27, 2004

(54) INFORMATION PROCESSING APPARATUS AND METHOD USING A CONCEPTUAL DATABASE

(75) Inventors: Masanori Wakai, Kanagawa (JP); Satomi Kayano, Kanagawa (JP); Suresh Jeyachandran, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 225 days.

(21) Appl. No.: 09/912,336

(22) Filed: Jul. 26, 2001

(65) Prior Publication Data

US 2002/0059249 A1 May 16, 2002

(30) Foreign Application Priority Data

Jul. 31, 2000 (JP) ........................................ 2000-231325

(51) Int. Cl.[7] .............................................. G06F 17/30
(52) U.S. Cl. ...................... 707/3; 707/4; 707/5; 707/10; 707/100
(58) Field of Search ............................. 707/3, 4, 5, 100, 707/10

(56) References Cited

U.S. PATENT DOCUMENTS

| | | | |
|---|---|---|---|
| 5,123,103 A | * | 6/1992 | Ohtaki et al. .................. 707/5 |
| 5,418,948 A | * | 5/1995 | Turtle ............................ 707/4 |
| 6,279,000 B1 | | 8/2001 | Suda et al. .................... 707/10 |
| 6,317,823 B1 | | 11/2001 | Wakai et al. ................ 712/220 |
| 6,363,373 B1 | * | 3/2002 | Steinkraus ...................... 707/3 |
| 6,460,043 B1 | * | 10/2002 | Tabbara et al. ............. 707/100 |

FOREIGN PATENT DOCUMENTS

| | | |
|---|---|---|
| EP | 0596659 A2 * | 5/1994 |

* cited by examiner

*Primary Examiner*—Frantz Coby
(74) *Attorney, Agent, or Firm*—Fitzpatrick, Cella, Harper & Scinto

(57) ABSTRACT

In an information processing apparatus, a SurfaceRule table having surface-layer information, a ConceptRule table having conceptual information, a connection table for correlating the two tables, and a retrieval table storing an ID of a connection table corresponding to a character string are provided in a conceptual database. A conceptual instance corresponding to an input character string is formed by retrieving a retrieval table using the input character string, referring to a connection table using an obtained ID of the connection table, and acquiring information, such as a concept, a part of speech, a tense, a slot and the like, from fields of corresponding SurfaceRule table and ConceptRule table.

57 Claims, 42 Drawing Sheets

EXAMPLE 1). SENTENCE WHERE GRAMMATICAL INTERPRETATION
CONCEDES WITH CONCEPTUAL INTERPRETATION

'Send mail to Mike'

| GRAMMATICAL INTERPRETATION | CONCEPTUAL INTERPRETATION |
|---|---|
| 'マイクにメールを送りなさい' | 'Mikeにメールを送る' |

EXAMPLE 2). SENTENCE WHERE GRAMMATICAL INTERPRETATION
PROVIDES DIFFERENT MEANING

'mail Send Mike'

| GRAMMATICAL INTERPRETATION | CONCEPTUAL INTERPRETATION |
|---|---|
| 'メールがマイクに送る' | 'Mikeにメールを送る' |

FIG.14

1. WHEN NOT USING INSTANCE RETRIEVAL TABLE

2. WHEN USING INSTANCE RETRIEVAL TABLE

INPUT INFORMATIO:CHARACTER STRING 'printing'

CONNECTION TABLE /4801

| ID | SurfaceRule | ConceptRule |
|---|---|---|
| 1 | 26 | 92 |
| 2 | 1 | : |
| 3 | 128 | : |
| : | : | : |
| : | : | : |
| : | : | : |
| 231 | 80 | 10 |
| 232 | 110 | : |
| : | : | |

RETRIEVAL

INSTANCE RETRIEVAL TABLE 1 /4803

| ID | ConnectID | Surface |
|---|---|---|
| 1 | 100 | a |
| 2 | 35 | all |
| : | : | : |
| : | : | : |
| : | : | : |
| 112 | 6 | paper |
| : | : | : |
| 123 | 229 | printed |
| 124 | 231 | printing |
| 125 | : | |

SurfaceRule TABLE /4802

| ID | Surface | Grammar | Tense |
|---|---|---|---|
| 1 | : | : | : |
| : | : | : | : |
| : | : | : | : |
| 26 | book | 15000 | 00000 |
| 27 | book | 15001 | 14002 |
| : | : | : | : |
| : | : | : | 14002 |
| 79 | printed | 15001 | 14003 |
| 80 | printing | 15001 | 00000 |
| : | : | : | : |
| 128 | : | : | |

FIG.48

INSTANCE RETRIEVAL TABLE 2 ⟋5001

| ID | ConnectID | Surface |
|----|-----------|---------|
| ⋮ | ⋮ | ⋮ |
| 70 | 136 | CTRANS |
| 71 | 180 | CTREE |
| ⋮ | ⋮ | ⋮ |

REFERENCE

CONNECTION TABLE ⟋5002

| ID | SurfaceRule | ConceptRule |
|----|-------------|-------------|
| ⋮ | ⋮ | ⋮ |
| 136 | 54 | 80 |
| 137 | 14 | 13 |
| ⋮ | ⋮ | |

CONNECTION TABLE ID

FIG.50

BodyString TABLE

| Body | len | tailID |
|---|---|---|
| and | 3 | 0 |
| easy | 4 | 3 |
| print | 4 | 5 |
| send | 4 | * |

TailString TABLE

| ID | tail | Grammar | Tense |
|---|---|---|---|
| 0 |  | >15001 | 1 |
| 3 | ly | 15003 | 0 |
| 5 | d | 15001 | 2 |
| 5 | d | 15001 | 3 |
| : | ed | : | : |

SurfaceRule TABLE

| ID | Surface | Grammar | Tense |
|---|---|---|---|
| 1 | print | 15001 | 1 |
| 2 | printed | 15001 | 2 |
| 3 | printed | 15001 | 3 |
| 4 | printing | 15001 | 4 |
| 5 | prints | 15001 | 5 |
| 6 | : | : |  |

FIG.53

INFORMATION PROCESSING APPARATUS AND METHOD USING A CONCEPTUAL DATABASE

BACKGROUND OF THE INVENTION

1. Field of the Invention

The present invention relates to information processing utilizing a conceptual database.

2. Description of the Related Art

Conventionally, for example, in automatic translation using translation software, translation processing is performed by replacing words according to matching at a surface-layer level (in units of a word).

However, in translation processing by replacement of words, it is difficult to provide a meaning corresponding to actual contents, resulting in translation in which the context and the object of a sentence cannot be correctly understood.

In addition, in the form of a database of correspondence between arbitrary two languages, it is necessary to provide a dictionary for each language, and to provide databases whose number equals the number of languages.

Conventionally, data is retrieved from a database according to matching with specific data. However, this approach is unsuitable for data retrieval from a conceptual database having various data in a complex state.

SUMMARY OF THE INVENTION

It is an object of the present invention to provide an information processing apparatus and method in which data of a conceptual database can be efficiently retrieved.

According to one aspect, the present invention which achieves the above-described object relates to an information processing apparatus including input means for inputting information, a conceptual database storing information to be input from the input means and information necessary for forming information relating to a conceptual instance, in a correlated state, and retrieval means for retrieving the conceptual database based on information input from the input means.

According to another aspect, the present invention which achieves the above-described object relates to an information processing method including an input step of inputting information, and a retrieval step of retrieving a conceptual database storing information to be input and information necessary for forming information relating to a conceptual instance, in a correlated state, based on information input from the input step.

According to still another aspect, the present invention which achieves the above-described object relates to a computer-readable program for controlling a computer to perform information processing. The program includes codes for causing the computer to perform an input step of inputting information, and a retrieval step of retrieving a conceptual database storing information to be input and information necessary for forming information relating to a conceptual instance, in a correlated state, based on the information input in the input step.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such an example, however, is not exhaustive of the various embodiments of the invention, and therefore reference is made to the claims which follow the description for determining the scope of the invention.

BRIEF DESCRIPTION OF THE DRAWINGS

FIG. 14 is a diagram illustrating examples of effects of translation according to conceptual interpretation;

FIG. 48 is a diagram illustrating the difference in the retrieval processing between when using the retrieval table 1 (by Surface) and when not using the retrieval table 1 (by Surface) in the retrieval processing;

FIG. 50 is a flowchart illustrating the structure of the retrieval table 2 (by Concept) used in the retrieval processing;

FIG. 53 is a diagram illustrating a SurfaceRule table, a BodyString table and a TailString table used in the retrieval processing.

DESCRIPTION OF THE PREFERRED EMBODIMENT

A preferred embodiment of the present invention will now be described in detail with reference to the drawings.

Figure 1:
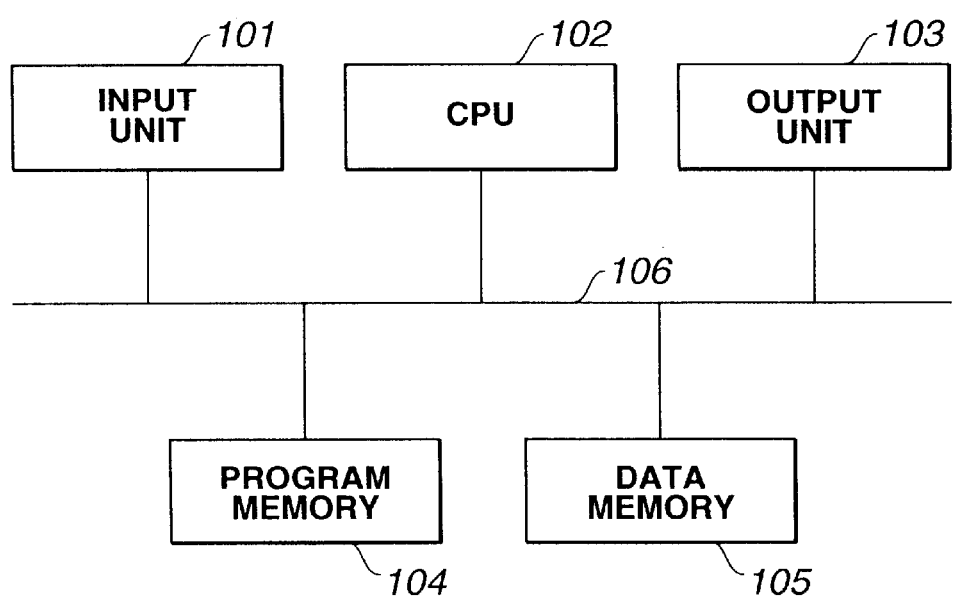
FIG. 1 is a block diagram illustrating the configuration of hardware of an information processing apparatus according to an embodiment of the present invention.

FIG. 1 is a block diagram illustrating the configuration of hardware of an information processing apparatus according to the embodiment.

In FIG. 1, an input unit 101 inputs information using a natural language or the like. The input unit 101 may, for example, comprise a keyboard for inputting characters using keys, a speech recognition device for inputting and recognizing a speech, a character recognition device for optically reading and recognizing characters from a document, an on-line/off-line hand-written-character recognition device, or a receiver for receiving information from another system, such as a device for receiving a result of recognition from a character recognition system, or may input information generated by another processing within the same apparatus. Alternatively, at least two of the above-described devices may be provided and selectively utilized.

A CPU (central processing unit) 102 performs calculation, logical determination or the like for each processing, and controls respective components connected to a bus 106.

An output unit 103 outputs information. The output unit 103 outputs data obtained from a database, and may, for example, comprise a speech synthesis device for synthesizing and outputting a speech from character information, a display device, such as a CRT (cathode-ray tube), a liquid-crystal display or the like, for displaying character information using character patterns, a printer for printing characters on a document, or a transmitter for transmitting information to another apparatus, such as a database. Output from the output unit 103 may be input to another processing unit within the same apparatus, such as a concept analysis unit or the like. Alternatively, at least two of the above-described devices may be provided and selectively utilized.

A program memory 104 stores programs for performing controls by the CPU 2 including processing procedures to be described later with reference to flowcharts. The program memory 104 may comprise a ROM (read-only memory), or a RAM (random access memory) where programs are to be loaded from an external storage device or the like.

A data memory 105 stores data generated in various types of processing, as well as knowledge of a knowledge base (to be described later). The data memory 105 may, for example, comprise a RAM. It is assumed that knowledge of a knowledge base is loaded from a nonvolatile external storage medium before starting processing, or is referred to whenever necessary.

The bus 106 transfers each address signal indicating a component to be controlled by the CPU 102, each control signal for controlling a corresponding component, and data exchanged between components.

Figure 2:
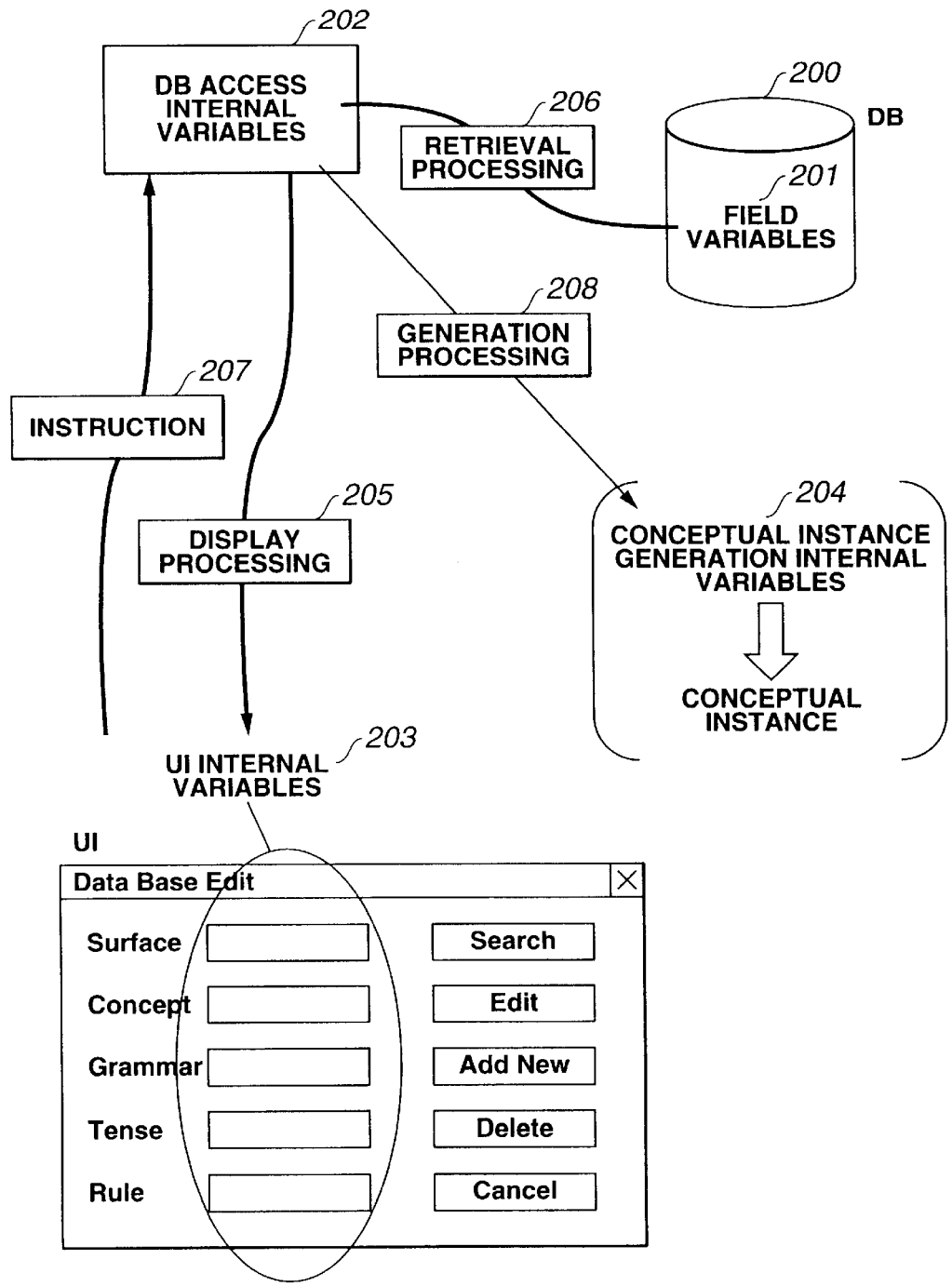
FIG. 2 is a diagram illustrating the relationship between a database and various data which are utilized by the information processing apparatus.

FIG. 2 illustrates the relationship between a database and various data utilized by the information processing apparatus.

A database (DB) 200 includes field variables 201, and stores field data corresponding to each field of the database 200.

The information processing apparatus includes UI internal variables 203, DB access internal variables 202, and conceptual instance formation internal variables 204, and utilizes data of the database 200.

The UI internal variables 203 correspond to respective input/output windows of an operation picture frame constituting a user interface (UI). A UI internal variable 203 stores input information, and is transmitted to a DB access internal variable 202 in accordance with an instruction on the operation picture frame. The UI internal variable 203 also refers to the DB access internal variable 202, is utilized in display processing 205 (to be described later), and displays output information.

The DB access internal variable 202 refers to a field variable 201, and is utilized in retrieval processing 206 (to be described later). The DB access internal variable 202 also transmits input information to the field variable 201 in accordance with an instruction on the operation picture frame by referring to the UI internal variable 203.

A conceptual instance generation internal variable 204 receives field data necessary for forming a conceptual instance from the DB access internal variable 202, and is utilized in conceptual instance generation processing 208.

Figure 3:
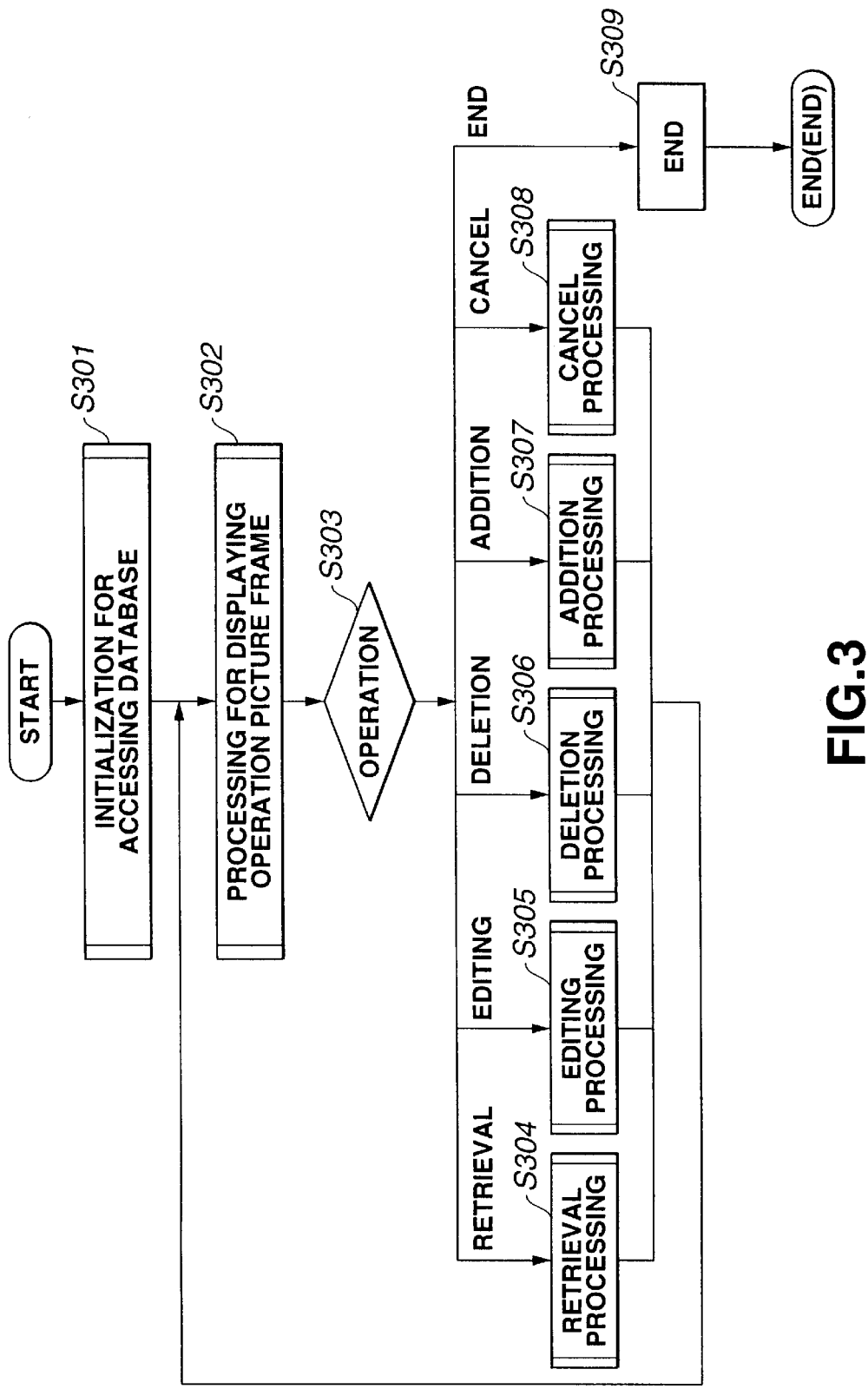
FIG. 3 is a flowchart of main-window processing illustrating the flow of the entire processing.

FIG. 3 is a flowchart of main window processing illustrating the flow of the entire processing of the information processing apparatus of the embodiment.

Figure 6:
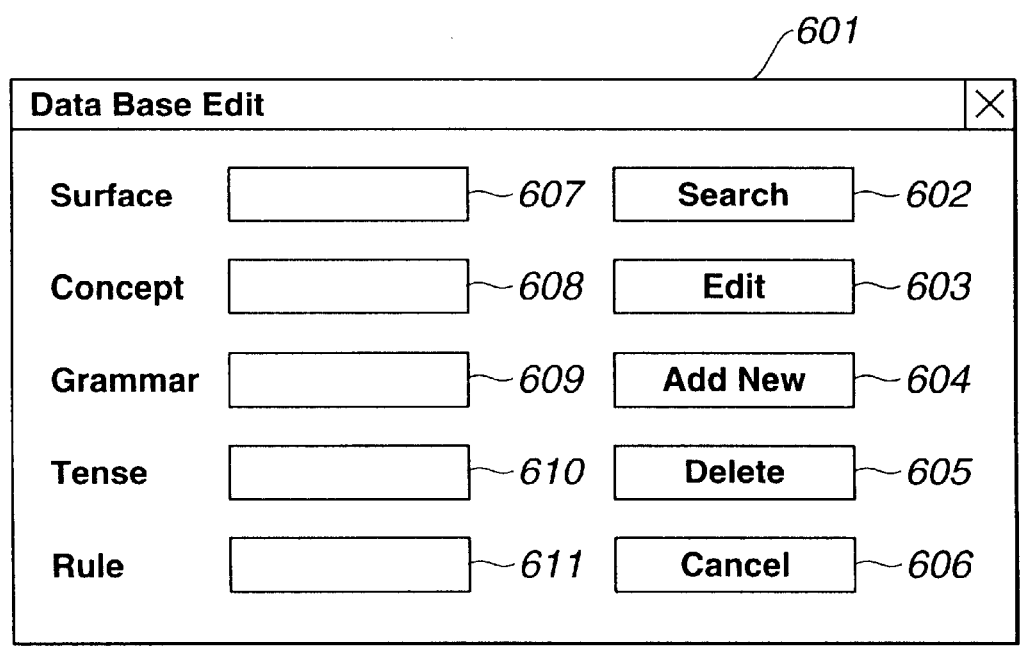
FIG. 6 is a diagram illustrating the operation picture frame of the information processing apparatus according to the embodiment.

When the information processing apparatus has been started, then, in step S301, each data is initialized by initializing processing for accessing a database (to be described later with reference to FIG. 4). Then, by processing for displaying an operation picture frame performed in step S302, an operation picture frame shown in FIG. 6 is displayed. FIG. 6 is a diagram illustrating the configuration of a user interface on the operation picture frame.

If the operator performs a certain operation on the operation picture frame, then, in step S303, the type of the operation is determined, and processing corresponding to the determined type is executed.

Figure 7:
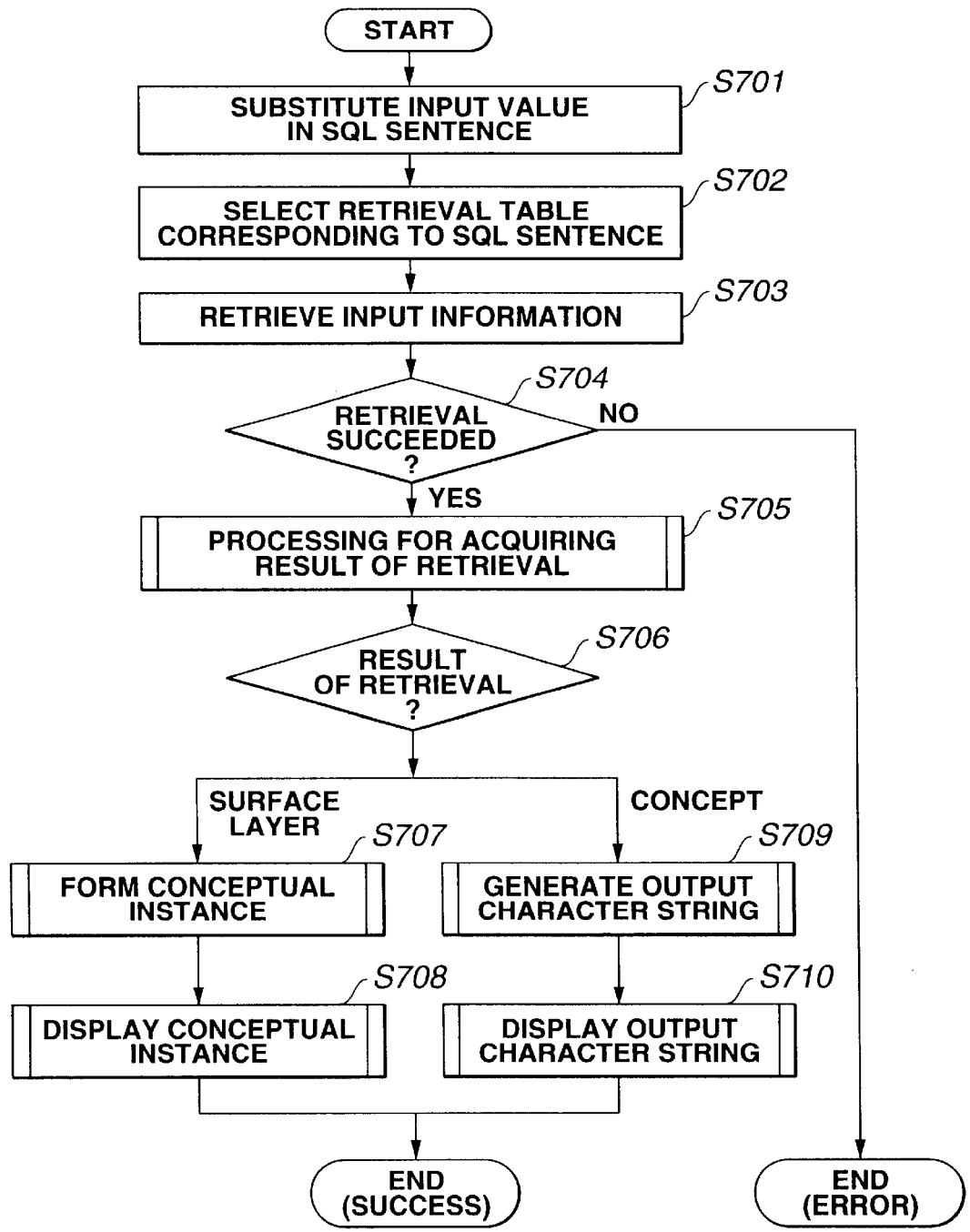
FIG. 7 is a flowchart illustrating the procedure of retrieval processing.

When a Search button 602 has been depressed on the operation picture frame shown in FIG. 6, it is determined that retrieval processing has been selected in step S303. Hence, retrieval processing in step S304 is selected, and retrieval processing to be described later with reference to FIG. 7 is started and executed.

Figure 8:
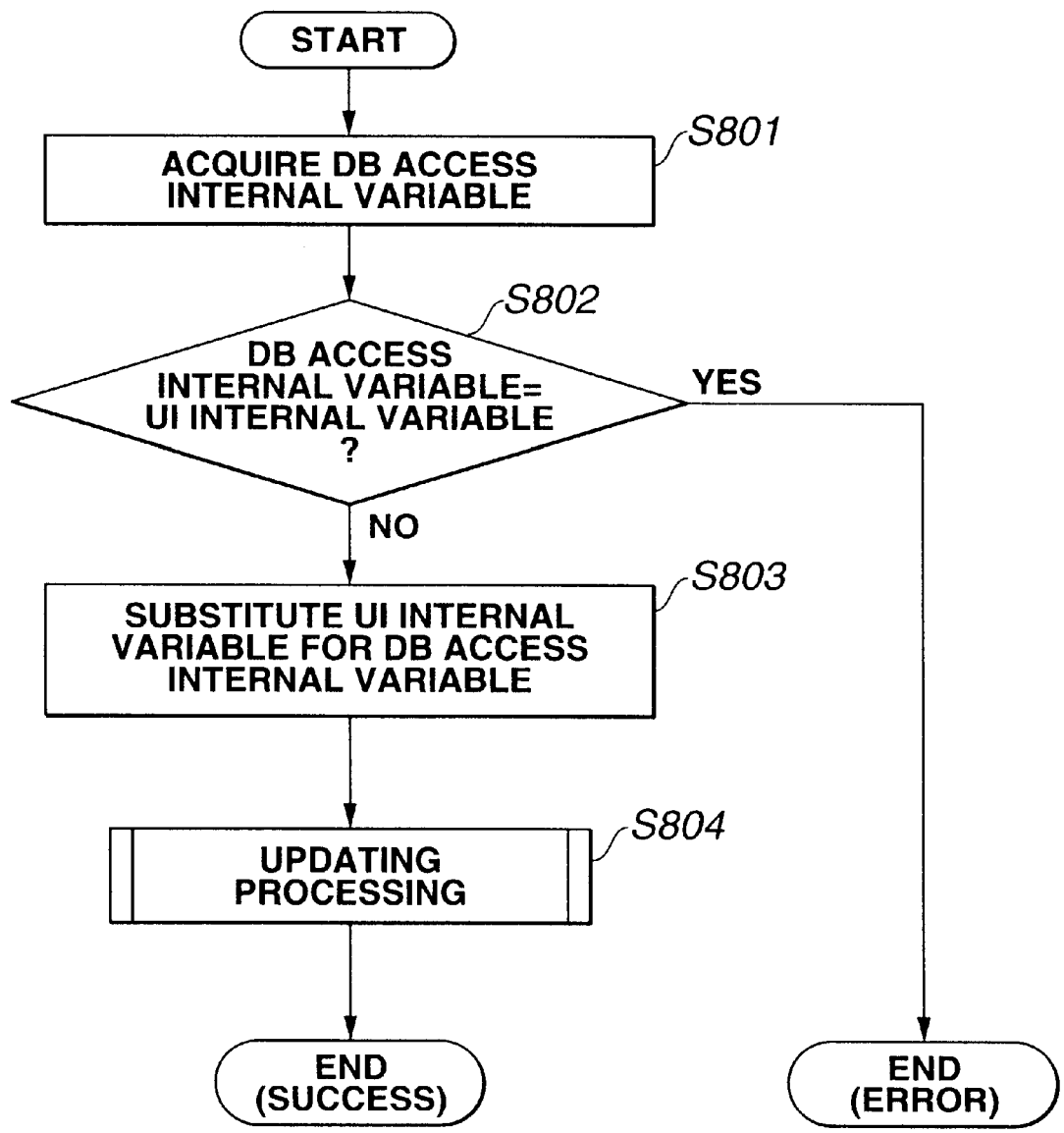
FIG. 8 is a flowchart illustrating the procedure of editing processing.

When an Edit button 603 has been depressed on the operation picture frame shown in FIG. 6, it is determined that editing processing has been selected in step S303. Hence, editing processing in step S305 is selected, and editing processing to be described later with reference to FIG. 8 is started and executed.

Figure 9:
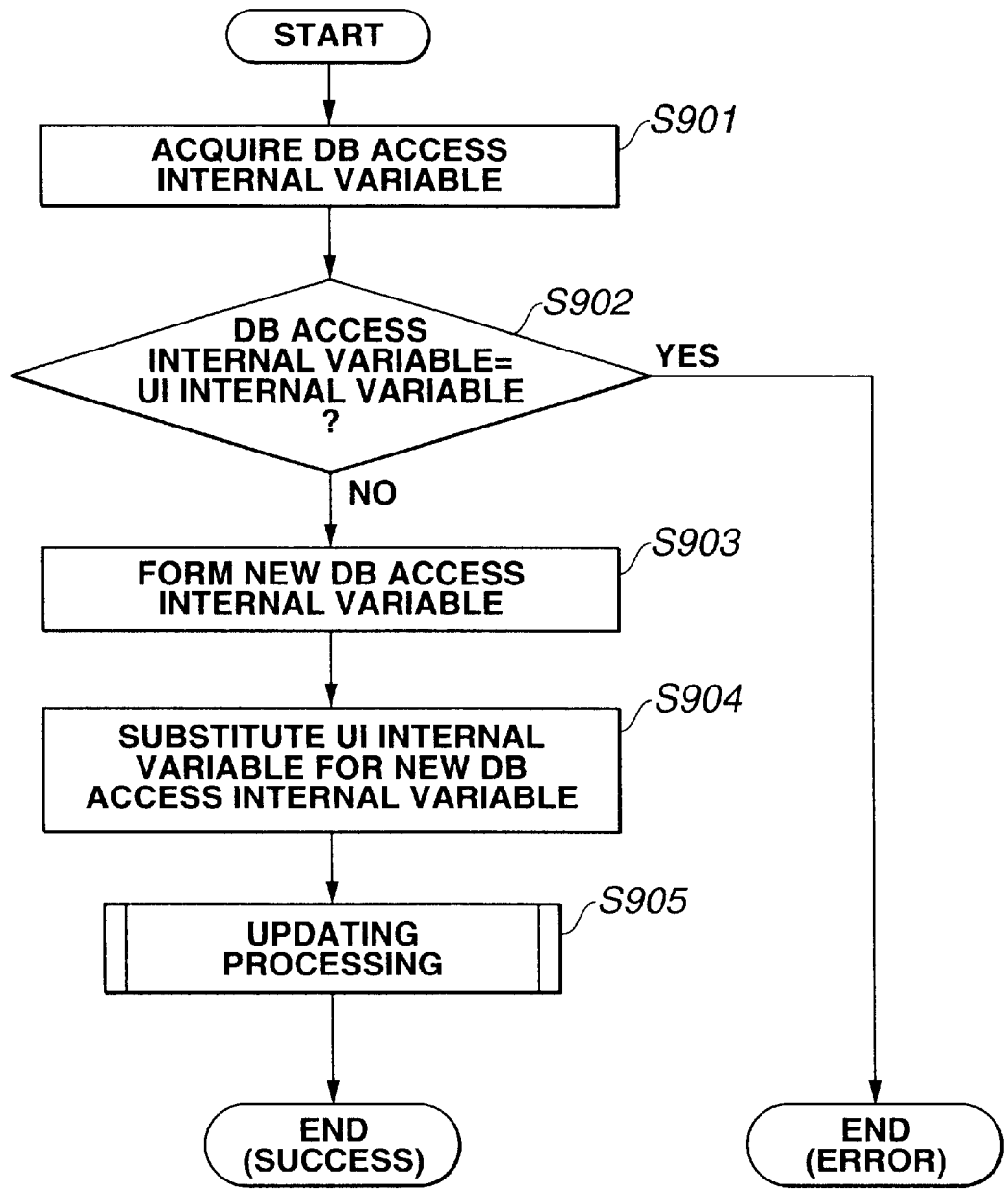
FIG. 9 is a flowchart illustrating the procedure of addition processing.

When an Add New button 604 has been depressed on the operation picture frame shown in FIG. 6, it is determined that addition processing has been selected in step S303. Hence, addition processing in step S306 is selected, and addition processing to be described later with reference to FIG. 9 is started and executed.

Figure 10:
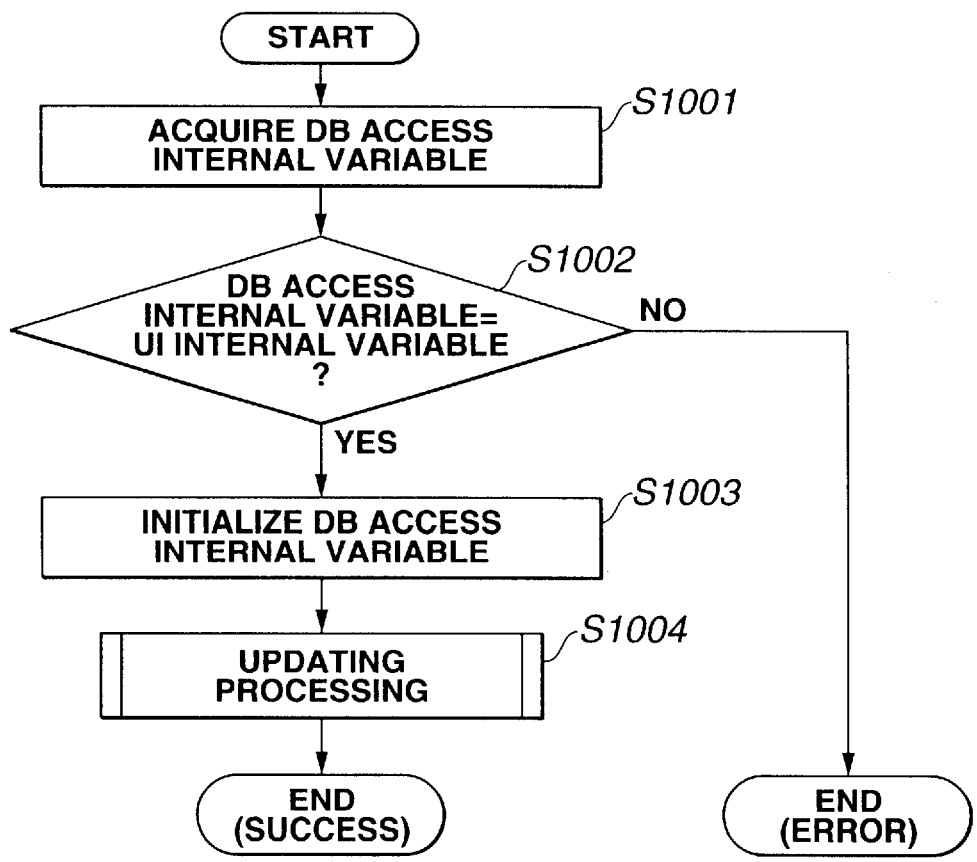
FIG. 10 is a flowchart illustrating the procedure of deletion processing.

When a Delete button 605 has been depressed on the operation picture frame shown in FIG. 6, it is determined that deletion processing has been selected in step S303. Hence, deletion processing in step S307 is selected, and deletion processing to be described later with reference to FIG. 10 is started and executed.

When a Cancel button 606 has been depressed on the operation picture frame shown in FIG. 6, it is determined that cancel processing has been selected in step S303. Hence, cancel processing in step S308 is selected, and input is cancelled.

When an escape key has been input during display of the operation picture frame shown in FIG. 6, it is determined that end processing has been selected in step S303. Hence, end processing in step S309 is selected, and the operation of the information processing apparatus is terminated.

Figure 4:
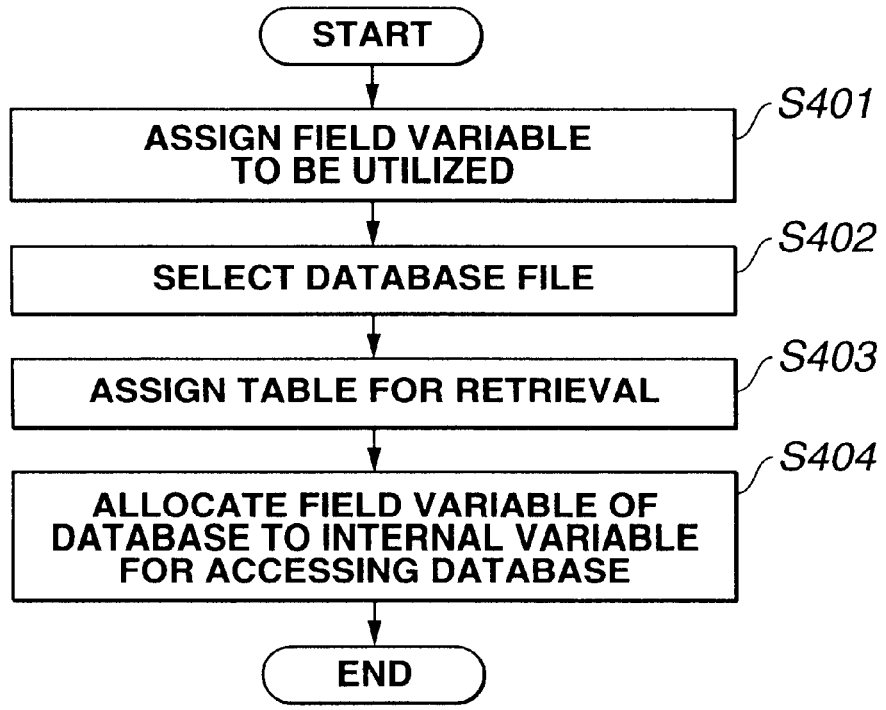
FIG. 4 is a flowchart illustrating the procedure of initializing processing for accessing the database.

FIG. 4 is a flowchart illustrating the procedure of initialization processing for accessing the database in the main window processing shown in FIG. 3.

When the initialization processing for accessing the database has been started, then, in step S401, a field variable is assigned in order to select field data to be utilized in the database. Then, the process proceeds to step S402, where a database file to be utilized is selected. Then, in step S403, a default table for retrieval is assigned. Then, in step S404, the above-described field variable is allocated to an internal variable for accessing the database, and the initialization processing is terminated.

Figure 5:
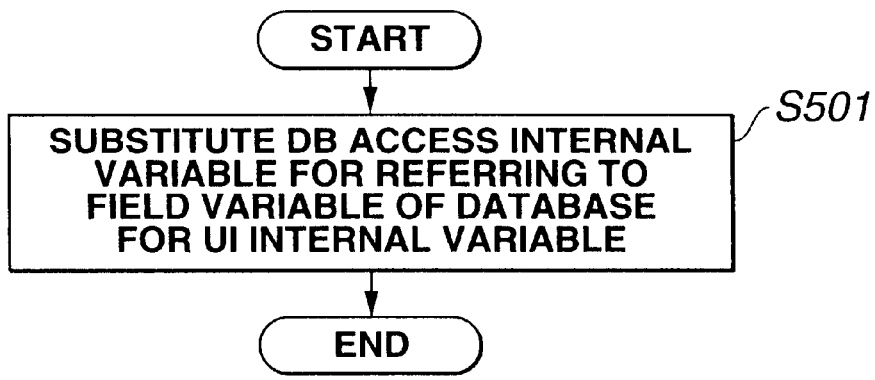
FIG. 5 is a flowchart illustrating the procedure of processing for displaying an operation picture frame.

FIG. 5 is a flowchart illustrating the procedure of processing for displaying the operation picture frame performed in step S302 in the main window processing shown in FIG. 3.

When the processing for displaying the operation picture frame is started, the process proceeds to step S501, where a DB access internal variable for referring to a field variable of the database is substituted for a UI internal variable, and data of the database is displayed on the operation picture frame.

FIG. 7 is a flowchart illustrating the procedure of the retrieval processing performed in step S304 in the main window processing shown in FIG. 3.

Upon start of the retrieval processing, the process proceeds to step S701, where an input character string is substituted for a SQL (structured query language) sentence to form a SQL sentence for retrieval. Then, in step S702, a retrieval table corresponding to the formed SQL sentenced is selected. Then, in step S703, input information is retrieved. Then, in step S704, it is determined if retrieval has succeeded. If the result of the determination in step S704 is affirmative, the process proceeds to step S705, where processing for acquiring the result of retrieval (to be described later with reference to FIG. 33) is started and executed.

Then, in step S706, the type of the result of retrieval is determined. If the result of retrieval is surface-layer information, the process proceeds to step S707, where processing for forming a conceptual instance (to be described later with reference to FIG. 39) is started. Then, in step S708, processing for displaying the conceptual instance (to be described later with reference to FIG. 40) is started. Then, the process is terminated.

If the result of retrieval determined in step S706 is conceptual information, the process proceeds to step S709, where processing for generating the output character string (to be described with reference to FIG. 43) is started. Then, in step S710, processing for displaying an output character string (to be described later with reference to FIG. 44) is started. Then, the process is terminated.

FIG. 8 is a flowchart illustrating the procedure of the editing processing performed in step S305 in the main window processing shown in FIG. 3.

Upon start of the editing processing, the process proceeds to step S801, where a DB access internal variable is acquired. Then, in step S802, it is determined if the DB access interval variable coincides with the UI internal variable. If the result of the determination in step S802 is negative, the process proceeds to step S803, where the UI internal variable is substituted for the DB access internal variable. Then, in step S804, updating processing (to be described later with reference to FIG. 11) is started. Then, the process is terminated.

FIG. 9 is a flowchart illustrating the procedure of addition processing performed in step S306 in the main window processing shown in FIG. 3.

Figure 11:
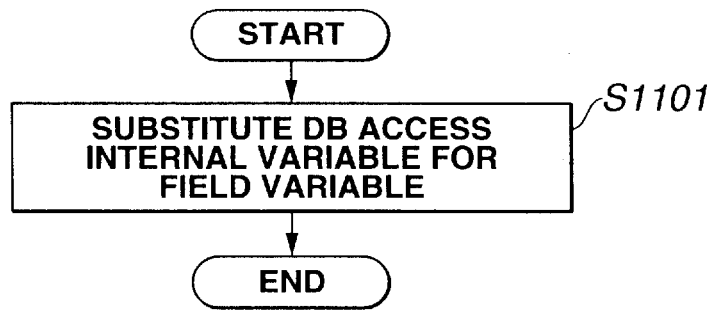
FIG. 11 is a flowchart illustrating the procedure of updating processing.

Upon start of the addition processing, the process proceeds to step S901, where a DB access internal variable is acquired. Then, in step S902, it is determined if the DB access internal variable coincides with the UI internal variable. If the result of the determination in step S902 is negative, the process proceeds to step S903, where a new DB access internal variable is added. Then, in step S904, the UI internal variable is substituted for the DB access internal variable. Then, in step S905, updating processing shown in FIG. 11 is started. Then, the process is terminated.

FIG. 10 is a flowchart illustrating the procedure of deletion processing performed in step S307 in the main window processing shown in FIG. 3.

Upon start of the deletion processing, the process proceeds to step S1001, where a DB access internal variable is acquired. Then, in step S1002, it is determined if the DB access internal variable coincides with the UI internal variable. If the result of the determination in step S1002 is affirmative, the process proceeds to step S1003, where the DB access internal variable is initialized. Then, in step S1004, the updating processing shown in FIG. 11 is started. Then, the process is terminated.

FIG. 11 is a flowchart illustrating the procedure of the updating processing in step S804 in the editing processing shown in FIG. 8, in step S905 in the addition processing shown in FIG. 9, or in step S1004 in the deletion processing shown in FIG. 10.

Upon start of the updating processing, the process proceeds to step S1101, where the DB access internal variable is substituted for the field variable.

Next, a description will be provided of a conceptual database utilized by the information processing apparatus used in this embodiment, with reference to the drawings.

Figure 12:
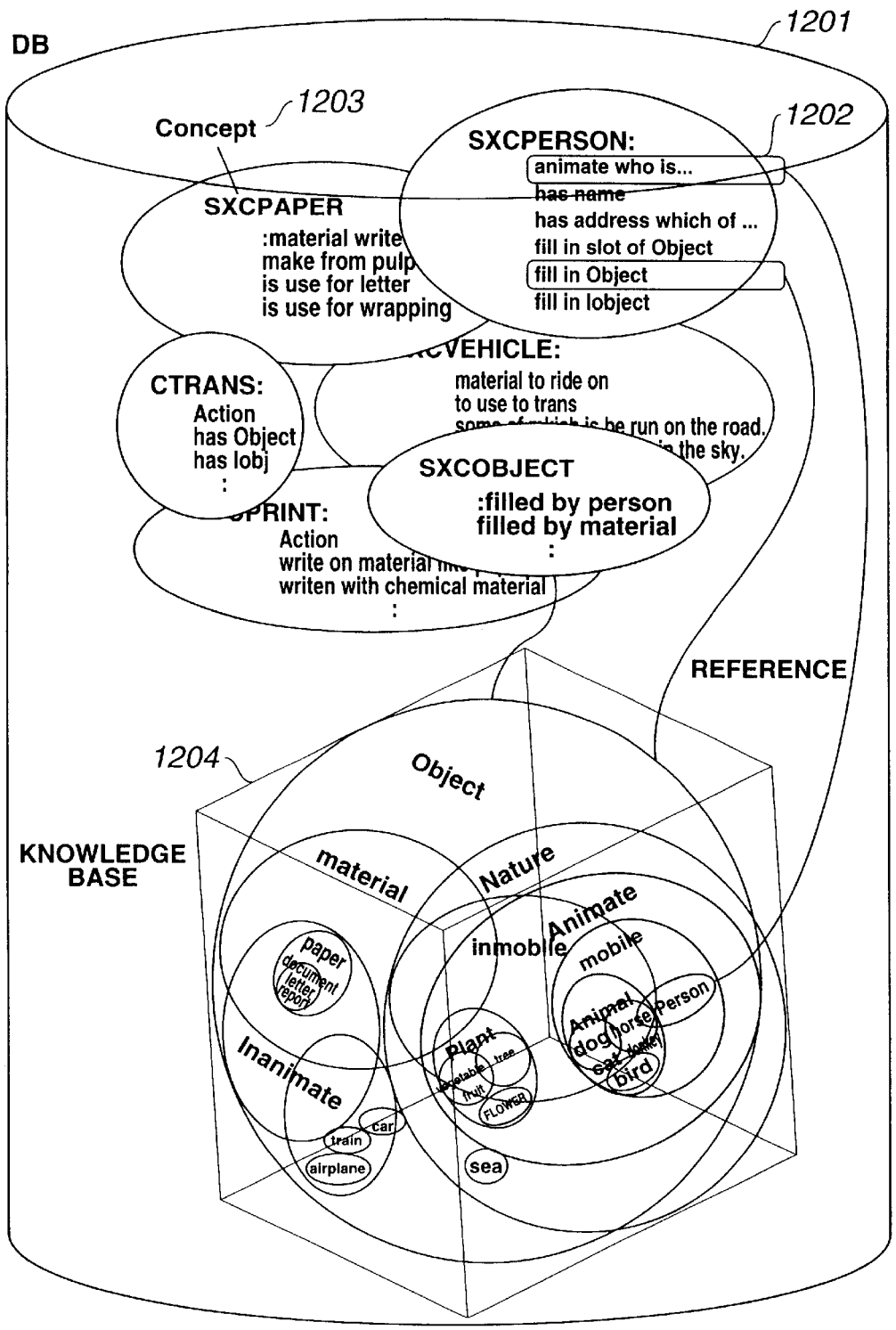
FIG. 12 is a diagram illustrating the relationship between concepts of a data base and a knowledge base.

FIG. 12 is a diagram illustrating the relationship between concepts of a database and a knowledge base. As shown in FIG. 12, information relating to the concepts is stored in a database 1201. A group of small concept units referring to a knowledge base 1204, i.e., a set of respective concept data 1202, is conceptual information=a Concept 1203.

Figure 13:
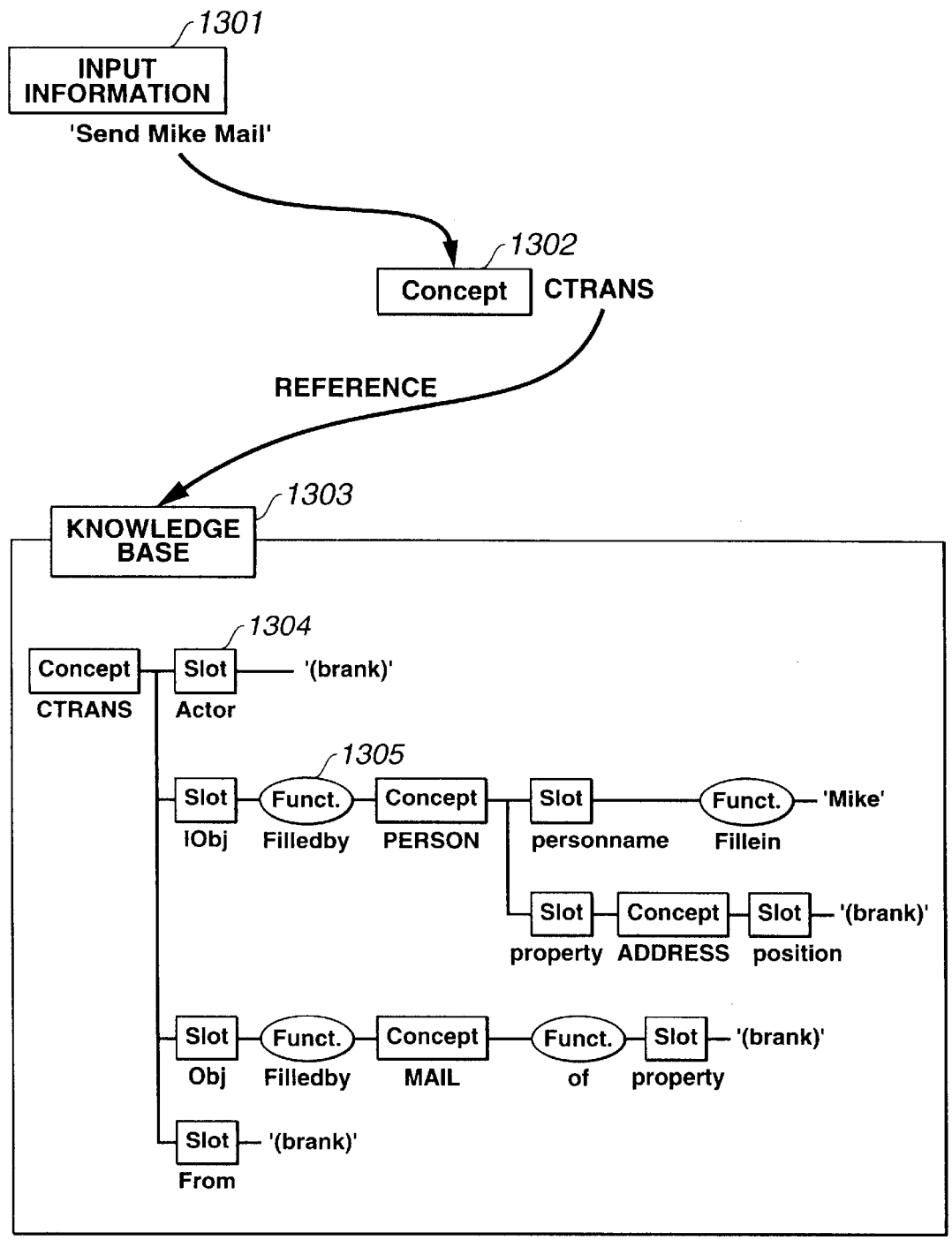
FIG. 13 is a diagram illustrating a configuration of a knowledge base.

FIG. 13 is a diagram illustrating a configuration of a knowledge base to be referred to by the Concept shown in FIG. 12.

A knowledge base 1303 to be referred to by a Concept 1302 acquired from input information 1301 includes Slots 1304. Each of the Slots includes a Concept connected by a Function 1305 representing processing to be executed.

For example, when input information 1301 is a character string 'Send Mike Mail', the Concept 1302 refers to the knowledge base 1303, and prepares conceptual information corresponding to the input information 1301. The conceptual information includes surface-layer information, serving as a symbol for representing the conceptual information. In this case, surface-layer information for the Concept 1302 is 'Send Mike Mail'.

FIG. 14 shows specific examples of the effects of translation according to conceptual interpretation, in the case of translation between English and Japanese.

In translation using conventional software, words are replaced according to matching at the surface-layer level, and therefore actual meaning is not always precisely transmitted.

For example, the contents of a sentence as shown in Example 1 are precisely translated. However, when the pattern of the sentence changes as shown in Example 2, the meaning of the sentence changes depending on interpretation. In Example 2, by using conceptual interpretation, translation having the correct meaning can be provided. By thus interpreting information with a concept, the correct meaning can be transmitted.

Figure 15:
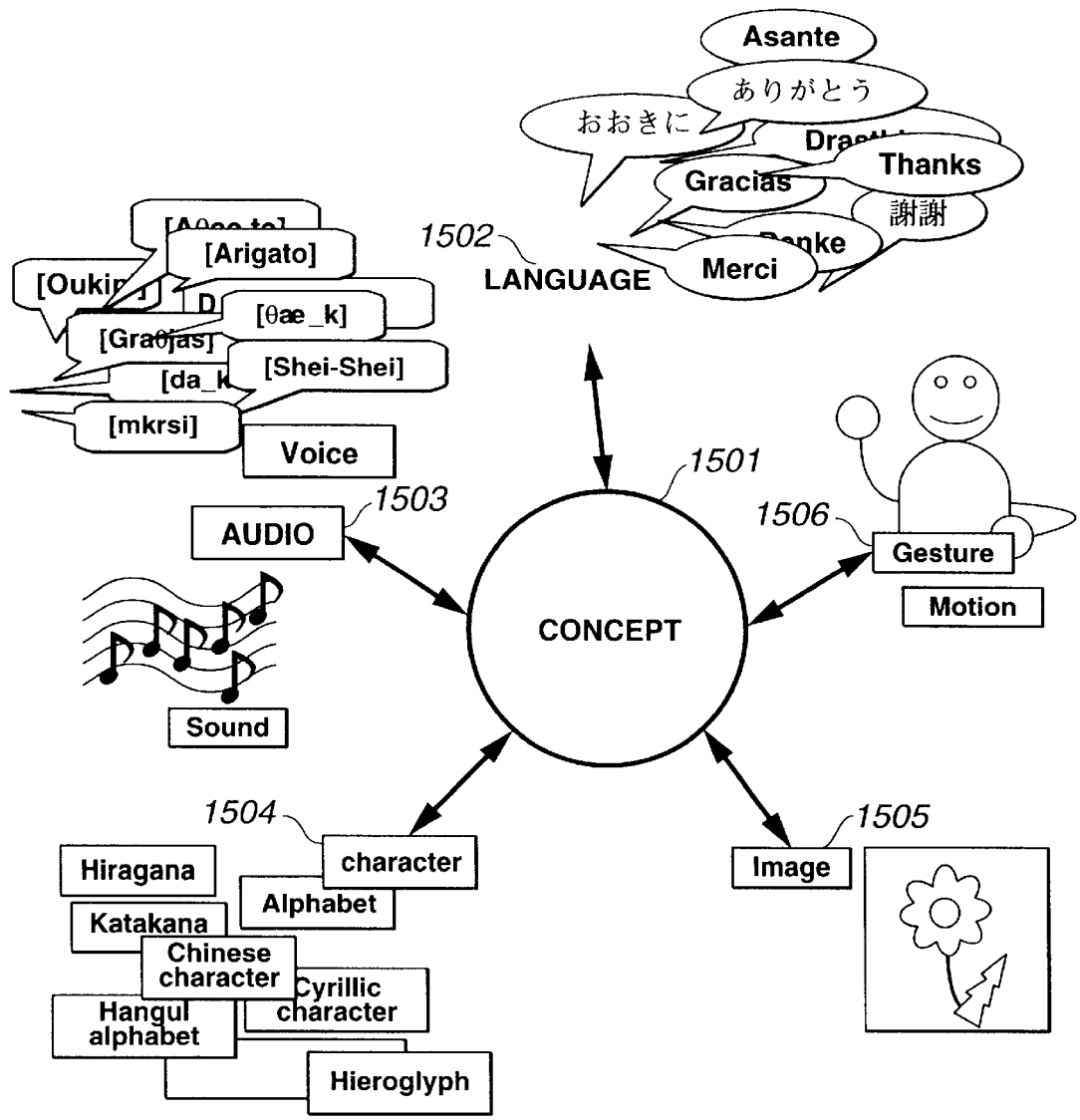
FIG. 15 is a diagram indicating the capability of handling sets of information having different forms of representation using various media with one concept.

FIG. 15 is a diagram illustrating the capability of handling sets of information represented by different media with a single concept. A language 1502, an audio 1503, a character 1504, an image 1505 and a gesture 1506 are handled with a concept 1501.

Figure 16:
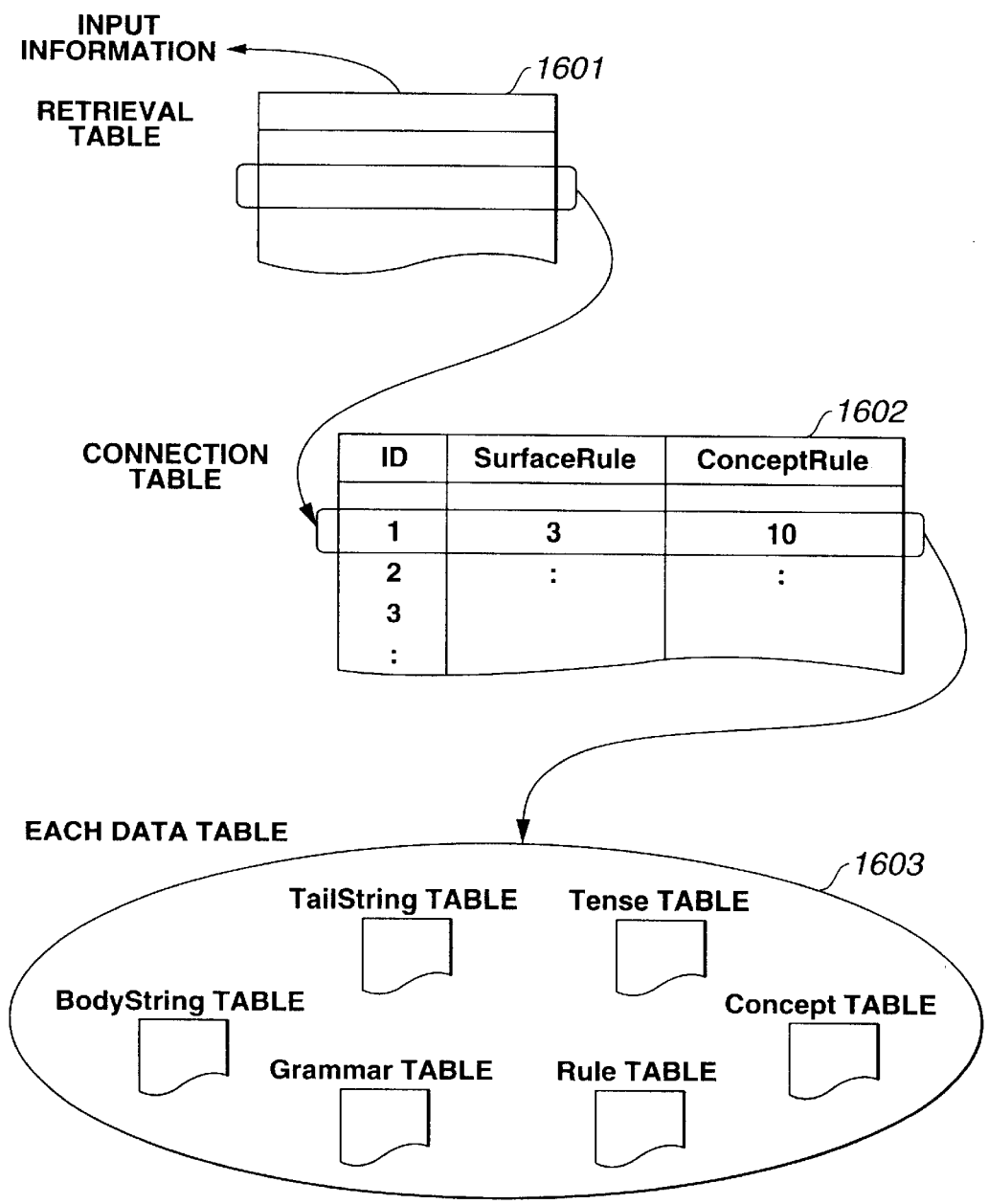
FIG. 16 is a diagram illustrating the structure of tables possessed by a database.

FIG. 16 is a diagram illustrating the structure of each table possessed by a database utilized by the information processing apparatus.

A retrieval table 1601 is formed based on data of a connection table 1602 and data of each data table 1603. The retrieval table 1601 is retrieved based on input information or information relating to a conceptual instance. The ID of a connection table 1602 corresponding to necessary information is acquired from the retrieval table 1601. It is possible to efficiently acquire information by using the retrieval table 1601.

If it is allowed to sacrifice efficiency, the retrieval table 1601 may be omitted.

Figure 17:
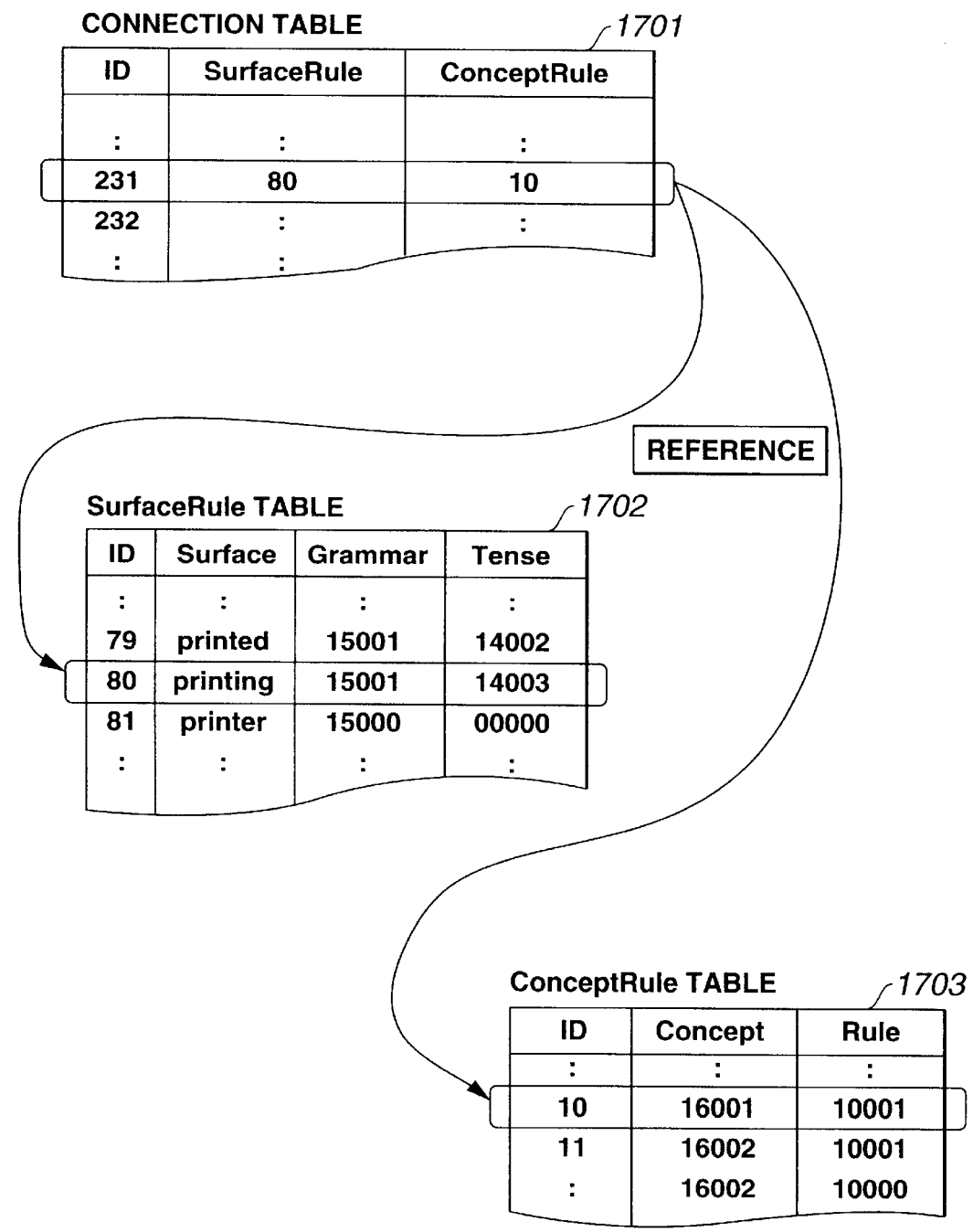
FIG. 17 is a diagram illustrating the structure of a connection table.

FIG. 17 is a diagram illustrating a connection table in the table structure of the database shown in FIG. 16.

A connection table 1701 provides correlation between a SurfaceRule table 1702 having surface-layer information (to be described later) and a ConceptRule table 1703 having conceptual information (to be described later).

In processing for forming a conceptual instance (to be described later with reference to FIGS. 32 and 33), data necessary for forming a conceptual instance is acquired by referring to the connection table 1701 and the SurfaceRule table 1702, serving as surface-layer information.

In processing for generating an output character string (to be described later with reference to FIGS. 42 and 43), data necessary for generating an output character string is acquired by referring to the connection table 1701 and the ConceptRule table 1703, serving as conceptual information.

Figure 18:
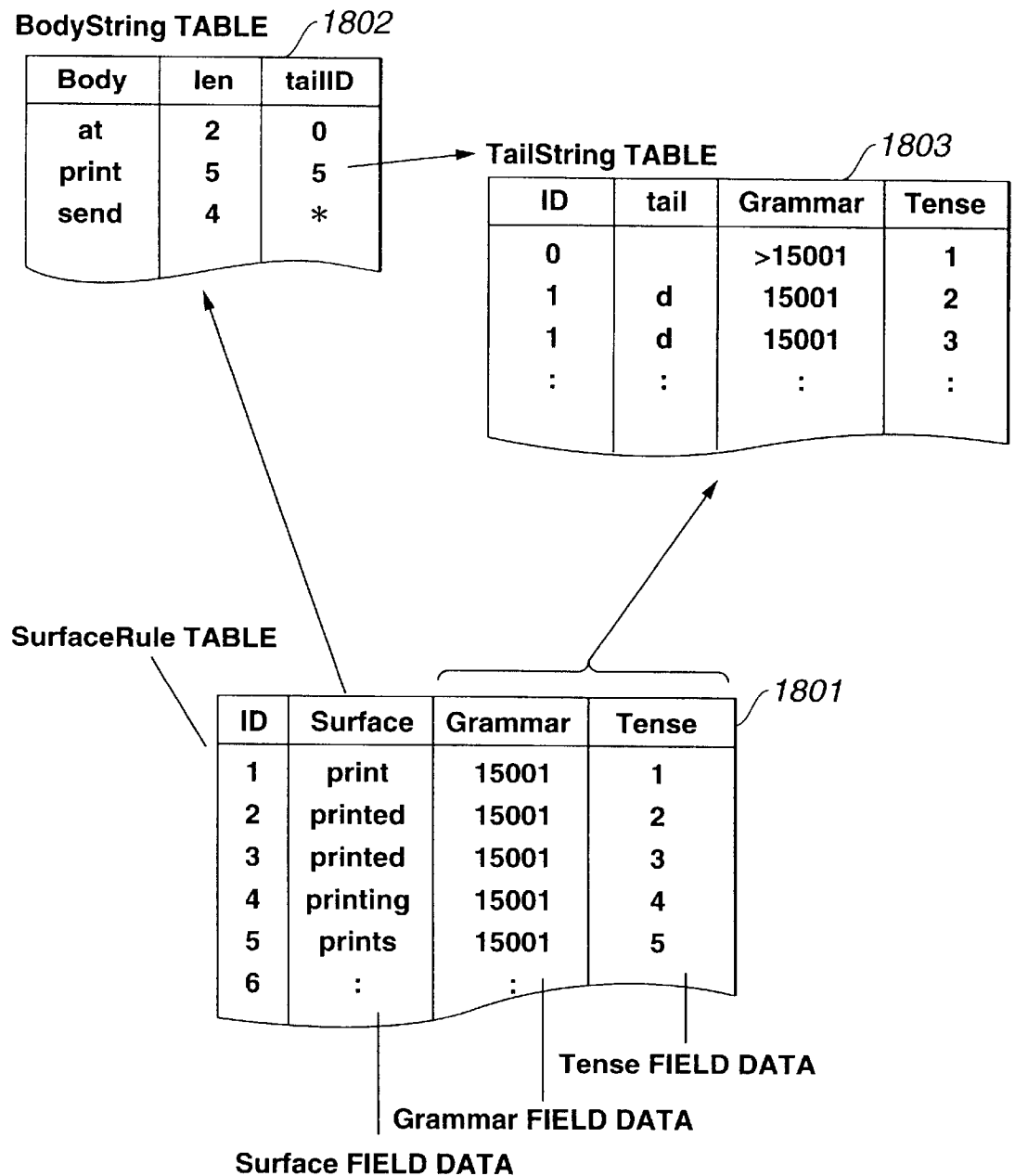
FIG. 18 is a diagram illustrating the structure of a SurfaceRule table.

FIG. 18 is a diagram illustrating the structure of a SurfaceRule table indicating surface-layer information in the structure of the connection table shown in FIG. 17.

A SurfaceRule table 1801 refers to a BodyString table 1802 and a TailString table 1803 (both to be described later), and includes Surface data indicating a representation, Grammar data indicating a grammatical rule, and Tense data indicating a tense, as field data.

Figure 19:
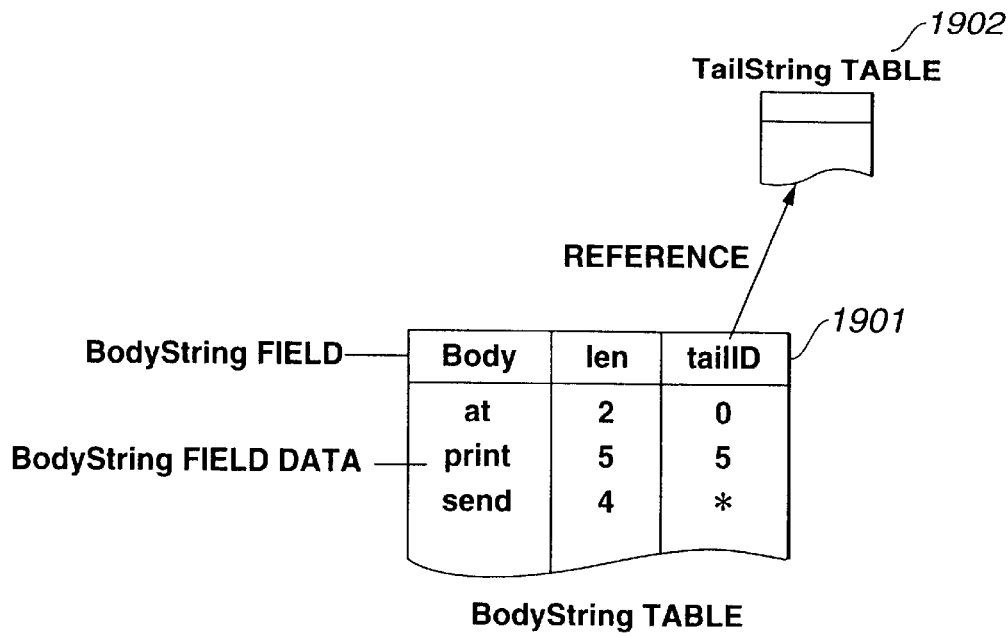
FIG. 19 is a diagram illustrating the structure of a BodyString table.

FIG. 19 is a diagram illustrating the structure of a BodyString table from among tables of the SurfaceRule table indicating surface-layer information shown in FIG. 18.

A BodyString table 1901 refers to a TailString table 1902 (to be described later), and includes Body data having information relating to an invariable character string of a word, len data indicating the length of the character string, and tailID data for referring to the TailString table 1902 with respect to a variable termination, as field data.

Figure 20:
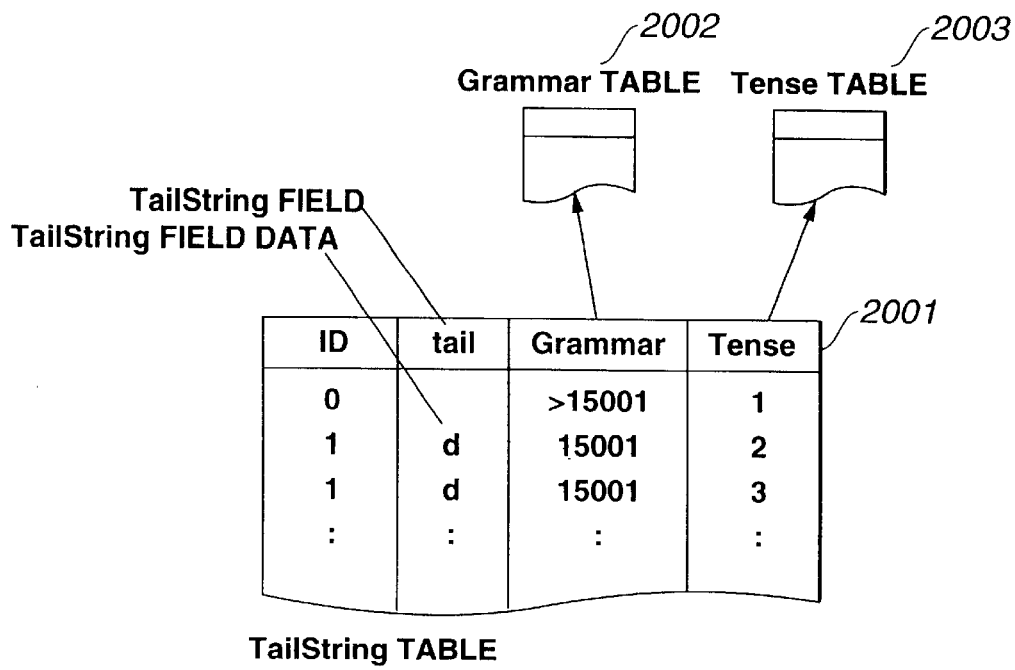
FIG. 20 is a diagram illustrating the structure of a TailString table.

FIG. 20 is a diagram illustrating the structure of a TailString table from among tables of the SurfaceRule table indicating surface-layer information shown in FIG. 18.

A TailString table 2001 refers to a Grammar table 2002 and a Tense table 2003 (both to be described later), and includes ID data indicating inflection rules, tail data having information relating to a corresponding termination, Grammar data (ID) for referring to a corresponding grammatical rule from the Grammar table 2002, and Tense data (ID) for referring to a corresponding tense from the Tense table 2003.

Figure 21:
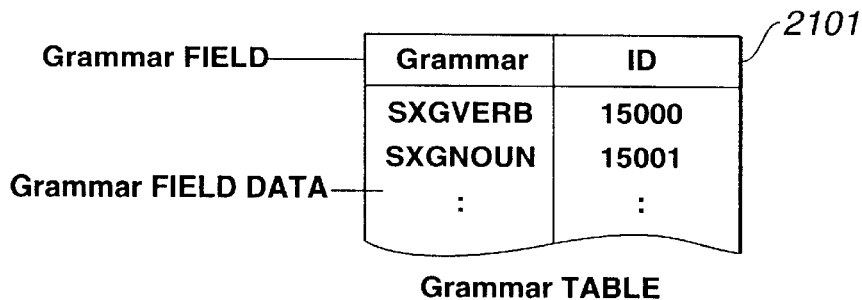
FIG. 21 is a diagram illustrating the structure of a Grammar table.

FIG. 21 is a diagram illustrating the structure of a Grammar table from among tables of the TailString table shown in FIG. 20.

A Grammar table 2101 has Grammar data indicating information relating to a grammatical rule for each ID, as field data.

Figure 22:
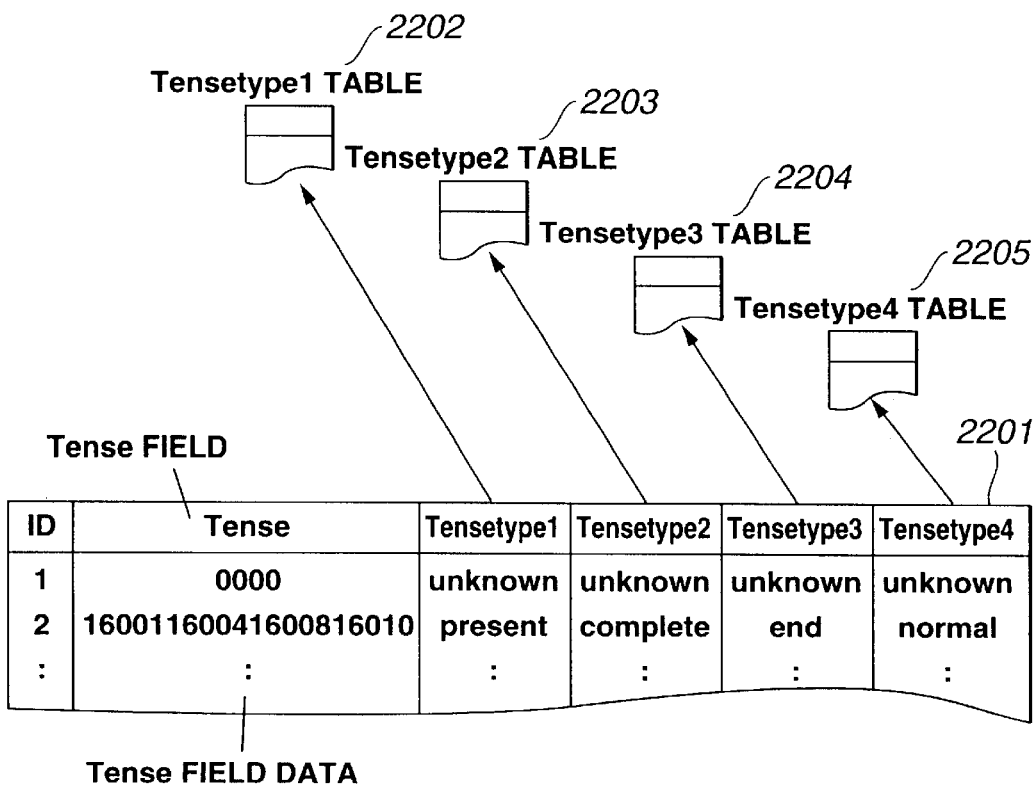
FIG. 22 is a diagram illustrating the structure of a Tense table.

FIG. 22 is a diagram illustrating the structure of a Tense table from among tables of the TailString table shown in FIG. 20.

A Tense table 2201 refers to a Tensetype1 table 2202, a Tensetype2 table 2203, a Tensetype3 table 2204, and a Tensetype4 table 2205 (all to be described later), and includes Tense data indicating tense information, as field data.

Figure 23:
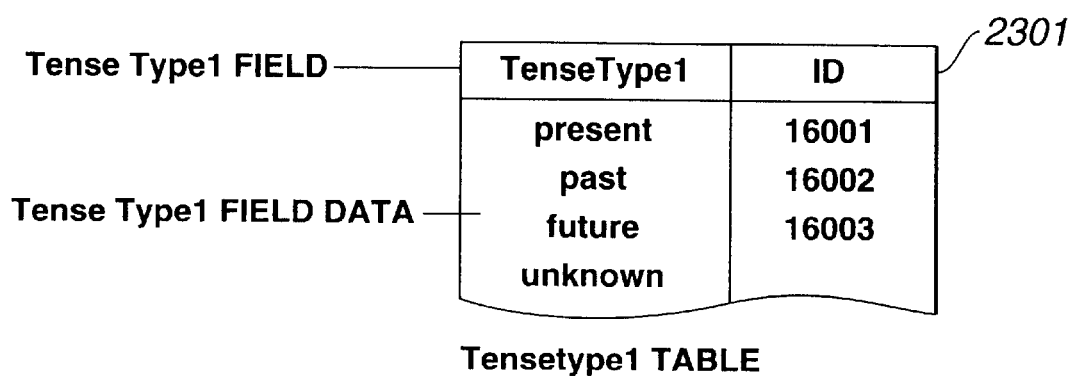
FIG. 23 is a diagram illustrating the structure of a Tense-Type1 table.

FIG. 23 is a diagram illustrating the structure of a TenseType1 table from among tables of the Tense table shown in FIG. 22.

A TenseType1 table 2301 includes TenseType1 data, serving as information relating to time (present, past or future), as field data.

Figure 24:
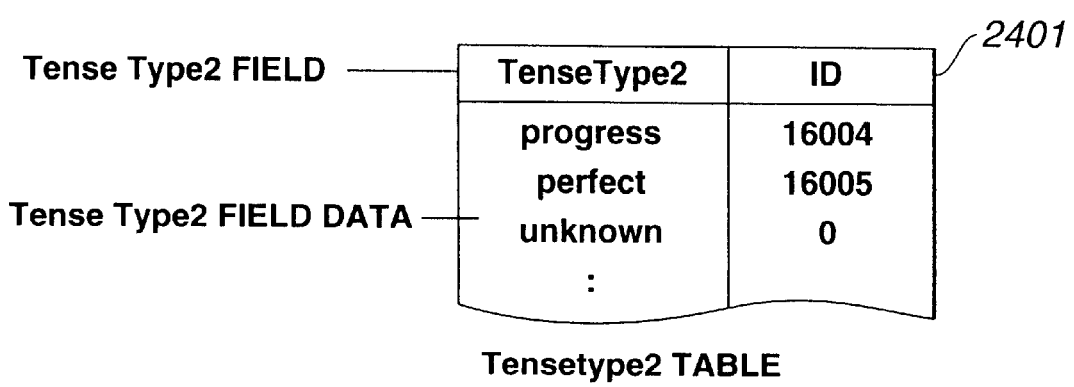
FIG. 24 is a diagram illustrating the structure of a Tense-Type2 table.

FIG. 24 is a diagram illustrating the structure of a TenseType2 table from among tables of the Tense table shown in FIG. 22.

A TenseType2 table 2401 includes TenseType2 data, serving as information relating to a state (progress or completion), as field data.

Figures 25, 26:
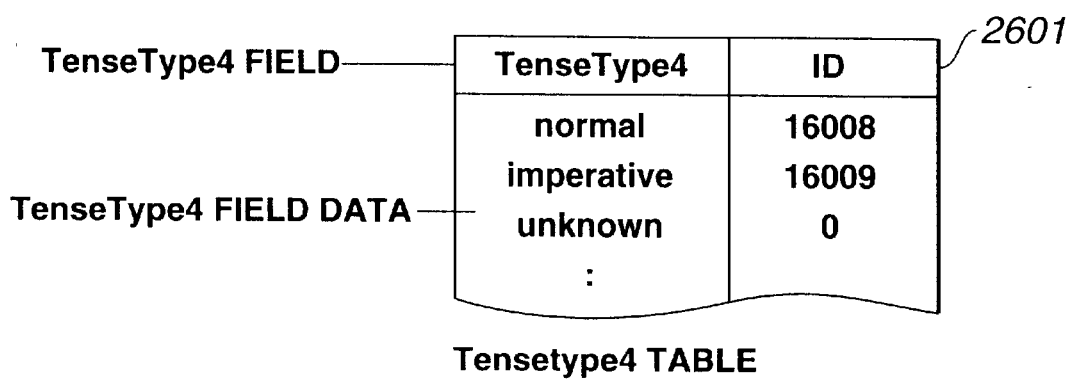
FIG. 25 is a diagram illustrating the structure of a Tense-Type3 table.
FIG. 26 is a diagram illustrating the structure of a Tense-Type4 table.

FIG. 25 is a diagram illustrating the structure of a TenseType3 table from among tables of the Tense table shown in FIG. 22.

A TenseType3 table 2501 includes TenseType3 data, serving as information relating to a start/end point of each state (start or end), as field data.

FIG. 26 is a diagram illustrating the structure of a TenseType4 table from among tables of the Tense table shown in FIG. 22.

A TenseType4 table 2601 includes TenseType4 data, serving as information relating to the voice of a sentence, such as active, passive, imperative or the like, as field data.

Figure 27:
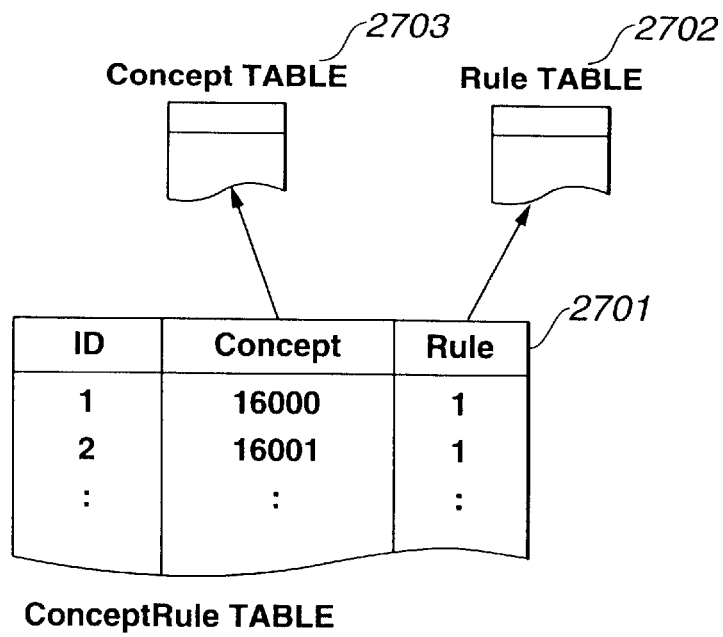
FIG. 27 is a diagram illustrating the structure of a ConceptRule table.

FIG. 27 is a diagram illustrating the structure of a ConceptRule table indicating conceptual information from among tables of the connection table shown in FIG. 17.

A ConceptRule Table 2701 includes Concept data and Rule data as field data, and refers to a Concept table 2703 and a Rule table 2702 (both to be described later).

Figure 28:
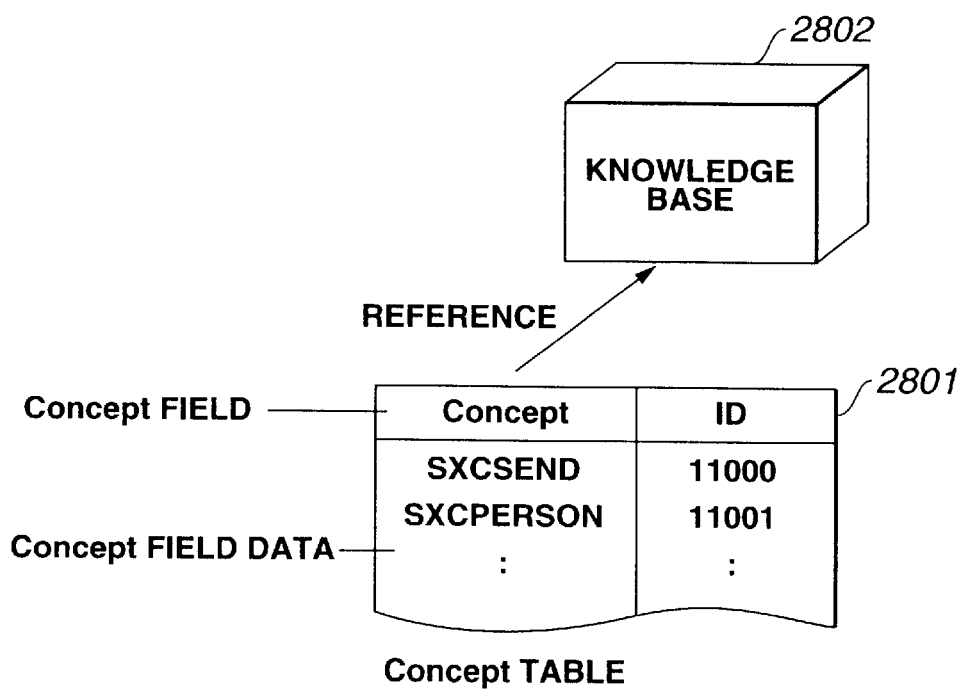
FIG. 28 is a diagram illustrating the structure of a Concept table.

FIG. 28 is a diagram illustrating the structure of a Concept table from among tables of the ConceptRule table indicating conceptual information shown in FIG. 27.

A Concept table 2801 refers to a knowledge base 2802 shown in FIG. 13, and includes Concept data indicating conceptual information, as field data.

Figure 29:
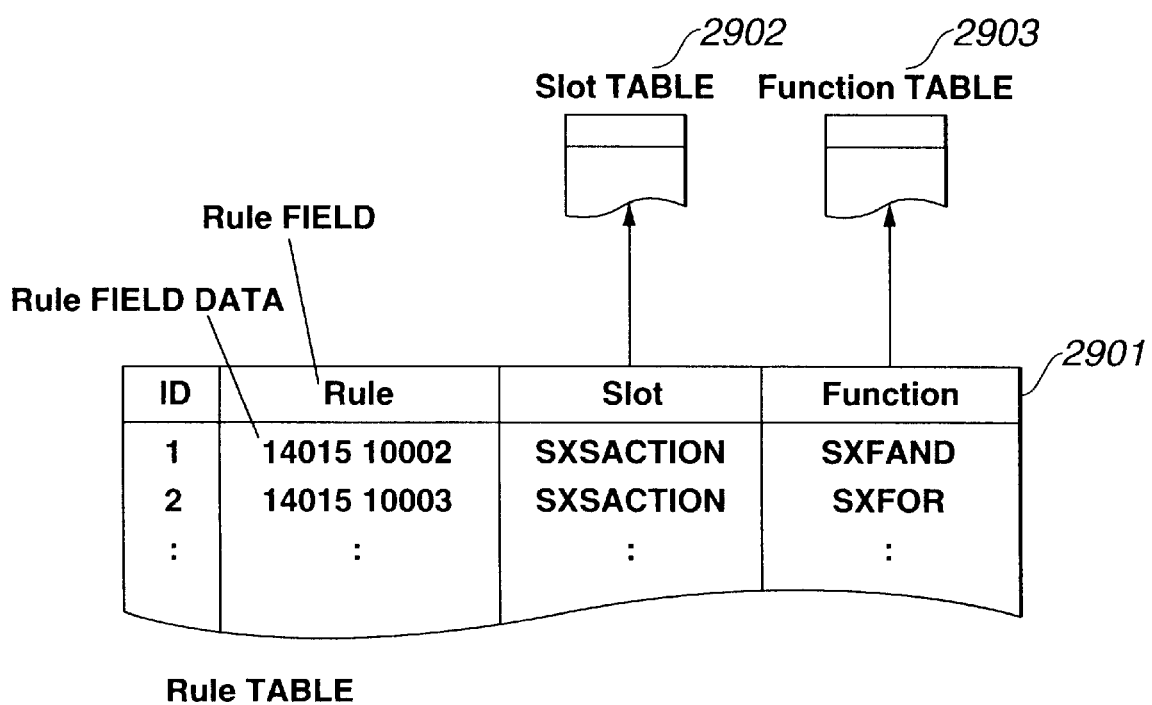
FIG. 29 is a diagram illustrating the structure of a Rule table.

FIG. 29 is a diagram illustrating the structure of a Rule table from among tables of the ConceptRule table indicating conceptual information shown in FIG. 27.

A Rule table 2901 refers to a Slot table 2902 and a Function table 2903 (both to be described later), and included Rule data indicating information relating to initialization rules, as field data.

Figure 30:
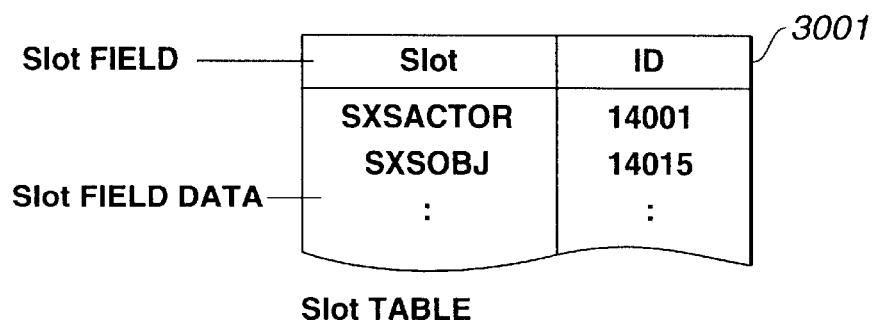
FIG. 30 is a diagram illustrating the structure of a Slot table.

FIG. 30 is a diagram illustrating the structure of a Slot table from among tables of the Rule table shown in FIG. 29.

A Slot table 3001 includes Slot data, serving as information relating to concept dependency, as field data.

Figure 31:
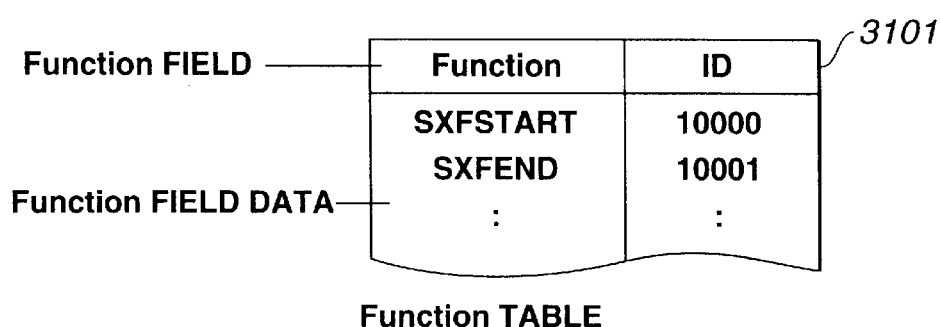
FIG. 31 is a diagram illustrating the structure of a Function table.

FIG. 31 is a diagram illustrating the structure of a Function table from among tables of the Rule table shown in FIG. 29.

A Function table 3101 includes information for providing concept dependency which complements the Slot data, as field data.

Next, a description will be provided of processing for forming a conceptual instance by inputting information in the information processing apparatus, with reference to the drawings.

Figure 32:
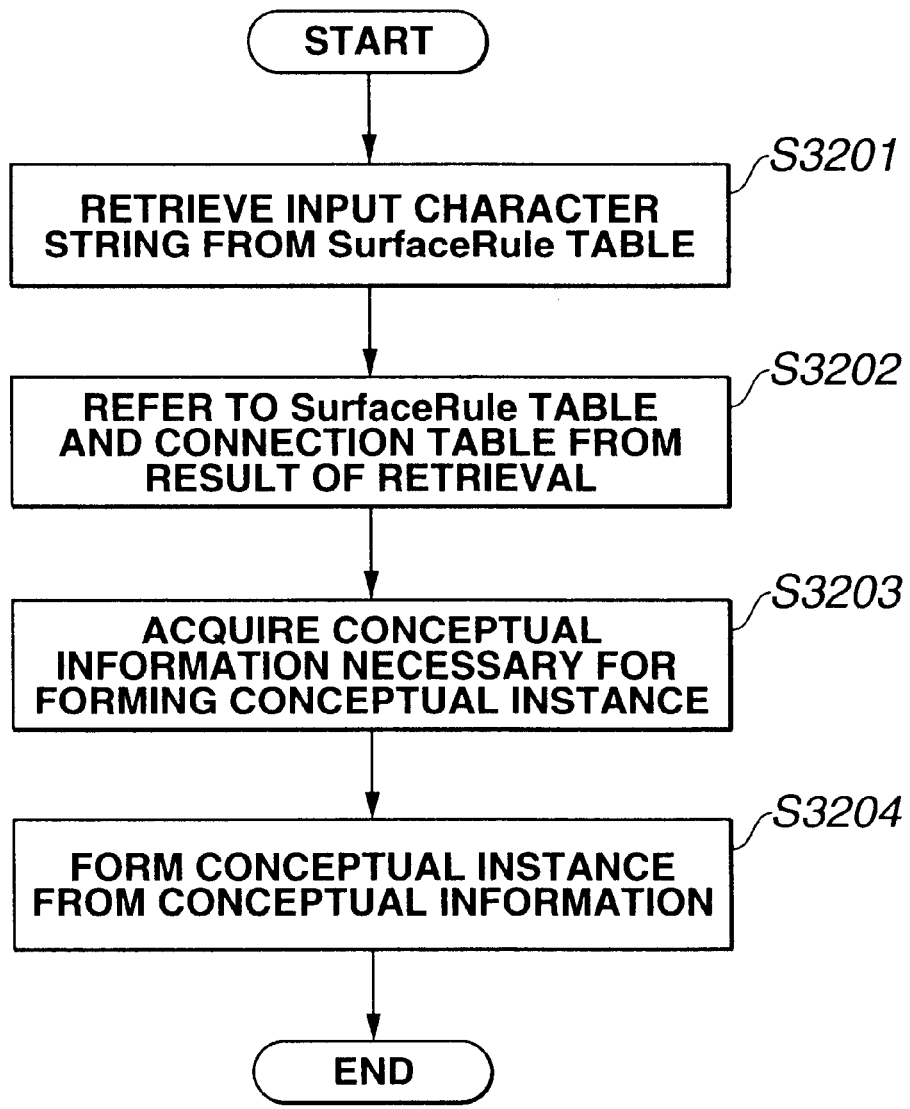
FIG. 32 is a flowchart illustrating the flow of conceptual-instance forming processing.

FIG. 32 is a flowchart illustrating a principal flow of processing for forming a conceptual instance in this embodiment.

The information processing apparatus is started by assigning an input character string, and forms a conceptual instance.

Upon start of processing for forming a conceptual instance, the process proceeds to step S3201, where the input character string is retrieved from the SurfaceRule table. Then, in step S3202, the SurfaceRule table and the connection table are referred to. Then, in step S3203, conceptual information necessary for forming a conceptual instance is acquired. Then, in step S3204, a conceptual instance is formed from the acquired conceptual information. Then, the process is terminated.

Figure 33:
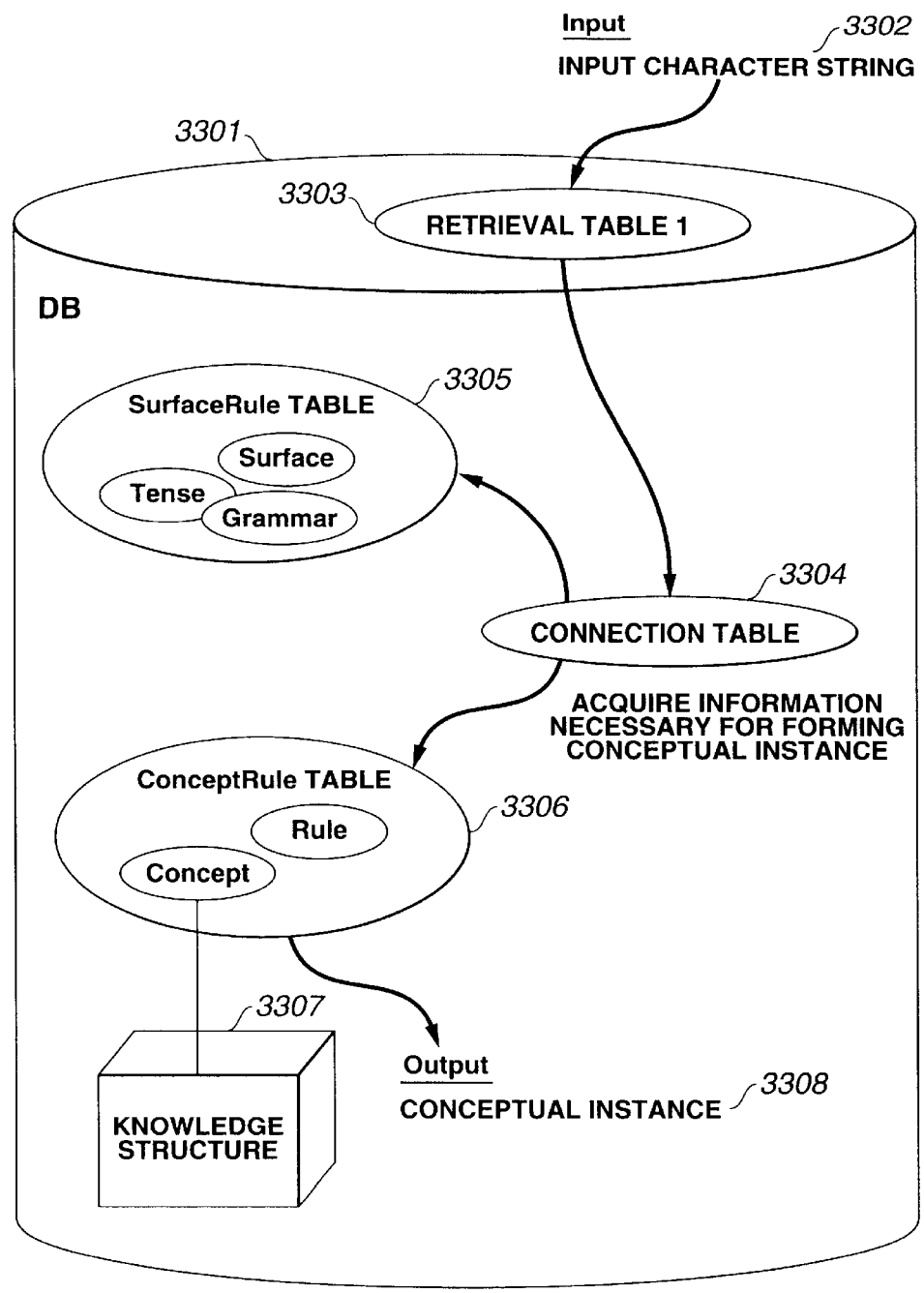
FIG. 33 is a diagram illustrating the flow of the conceptual-instance forming processing.

FIG. 33 is a diagram illustrating the flow of processing for forming a conceptual instance.

From an input character string 3302, Surface field data, Grammar field data and Tense field data of a SurfaceRule table 3305 are specified, and surface-layer information is acquired. By referring to the surface-layer information and a connection table 3304, information necessary for forming a conceptual instance is acquired. By referring to this information, ConceptRule data having conceptual information is specified, and a conception 3308 is acquired.

Figure 34:
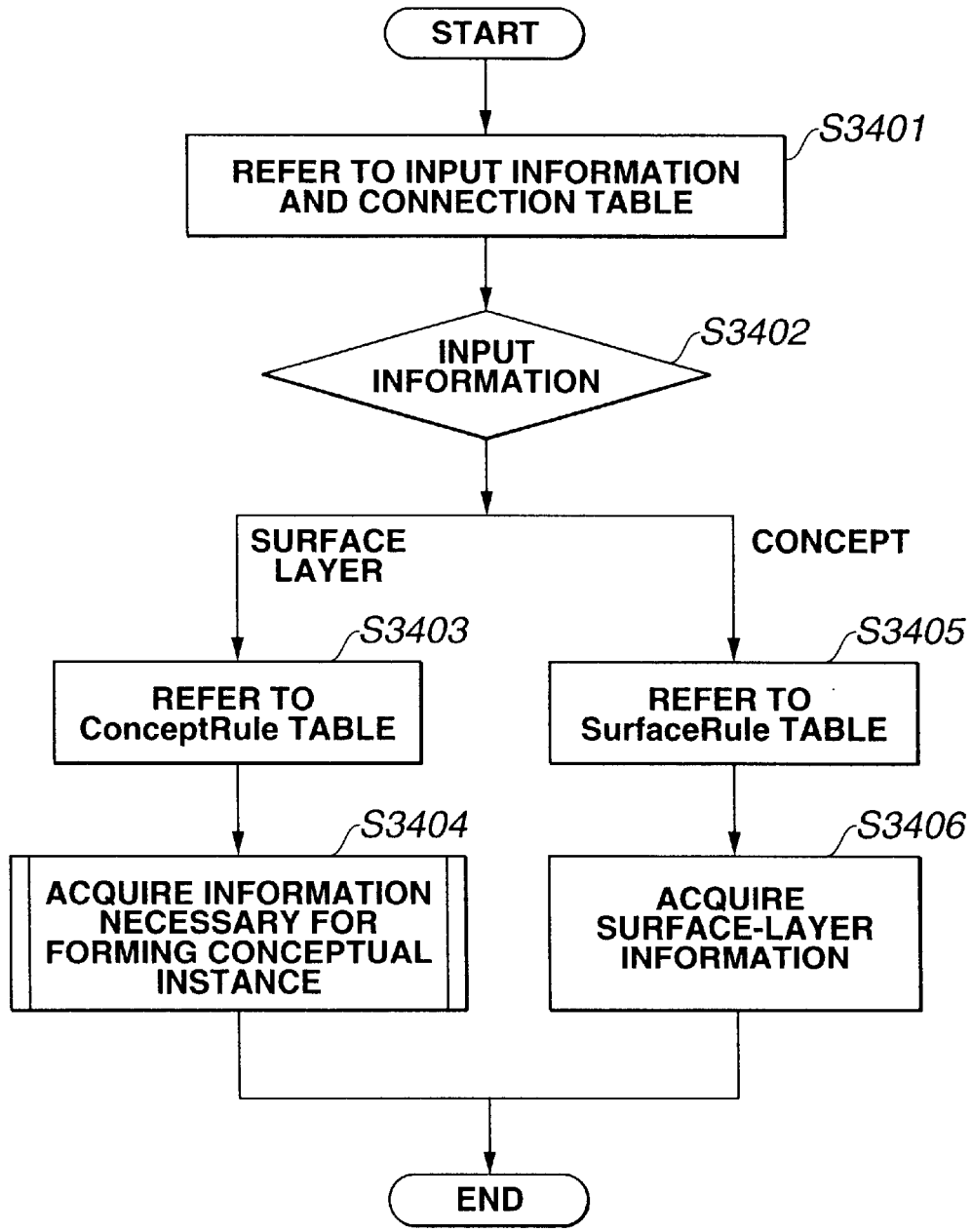
FIG. 34 is a flowchart illustrating the procedure of processing for acquiring a result of retrieval in the retrieval processing.

FIG. 34 is a flowchart illustrating the procedure of the processing for acquiring the result of retrieval performed in step S705 in the retrieval processing shown in FIG. 7.

Figure 35:
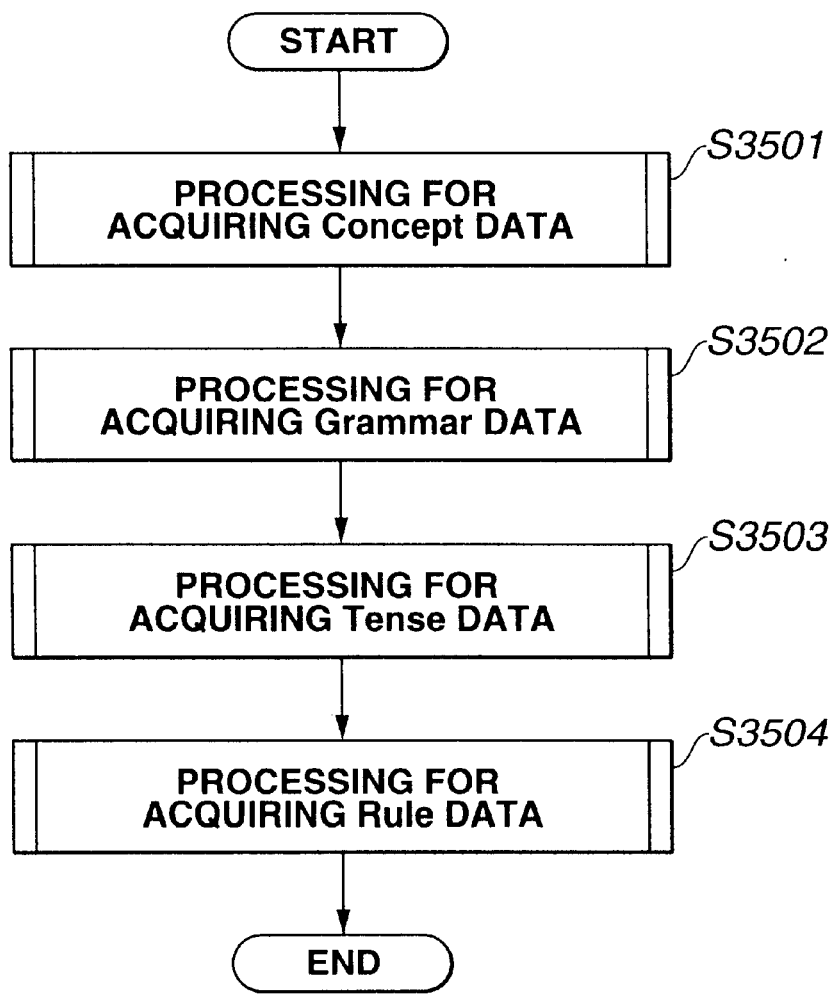
FIG. 35 is a flowchart illustrating the procedure of processing for acquiring information necessary for forming a conceptual instance in the retrieval processing.

Upon start of the processing for acquiring the result of retrieval, the process proceeds to step S3401, where input information and a connection table specified as the result of retrieval are referred to. Then, in step S3402, the type of the input information is determined. If the input information is surface-layer information, the process proceeds to step S3403, where the ConceptRule table is referred to. Then, in step S3404, processing for acquiring information necessary for forming a conceptual instance shown in FIG. 35 is started. Then, the process is terminated.

If the input information determined in step S3402 is conceptual information, the process proceeds to step S3405, where the SurfaceRule table is referred to. Then, in step S3406, surface-layer information is acquired. Then, the process is terminated.

FIG. 35 is a flowchart illustrating the procedure of processing for acquiring information necessary for forming a conceptual instance performed in step S3404 in the processing for acquiring the result of retrieval shown in FIG. 34.

Figure 36:
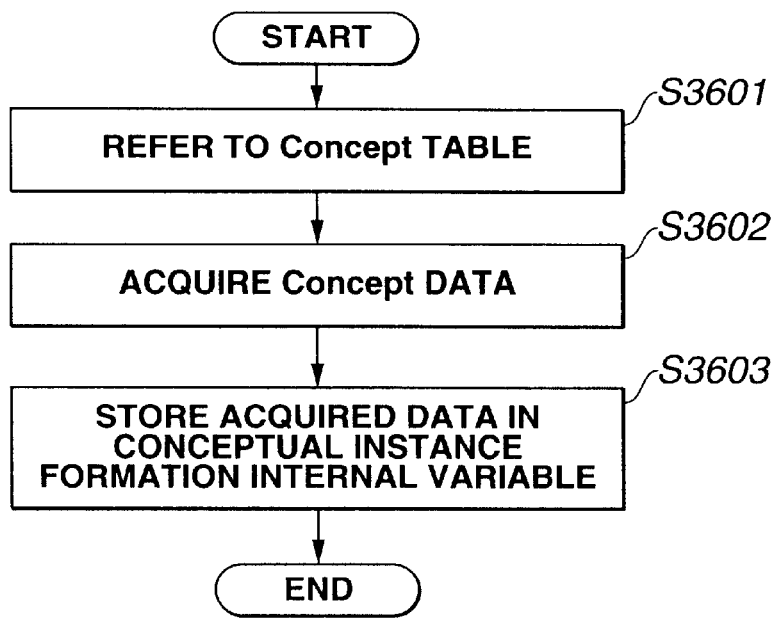
FIG. 36 is a flowchart illustrating the procedure of processing for acquiring Concept data in the conceptual-instance forming processing.
Figure 37:
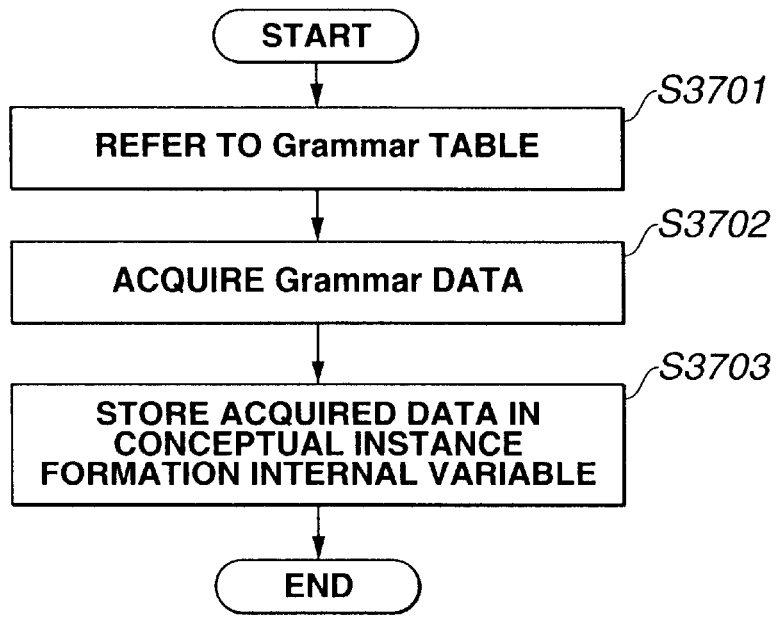
FIG. 37 is a flowchart illustrating the procedure of processing for acquiring Grammar data in the conceptual-instance forming processing.
Figure 38:
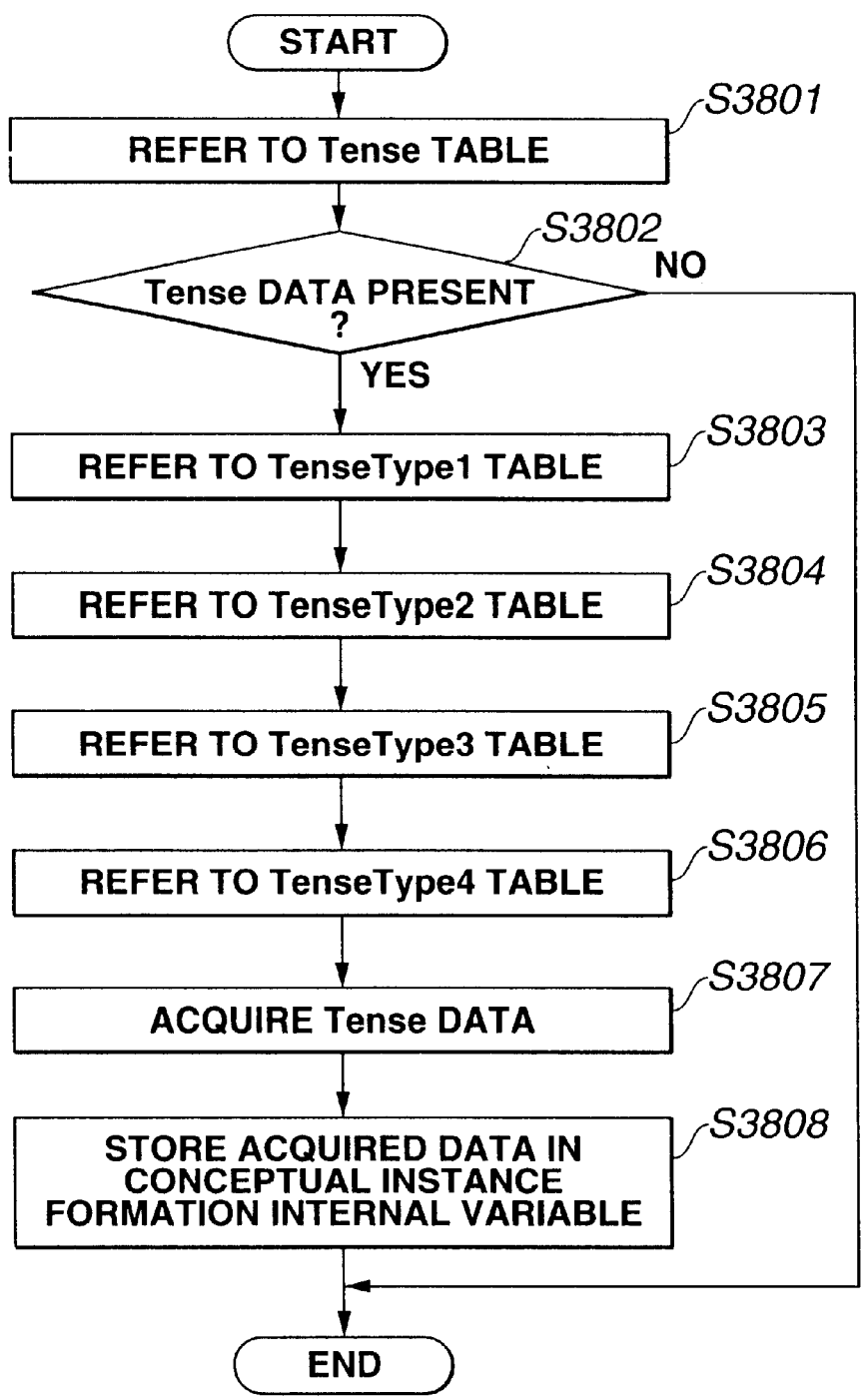
FIG. 38 is a flowchart illustrating the procedure of processing for acquiring Tense data in the conceptual-instance forming processing.
Figure 39:
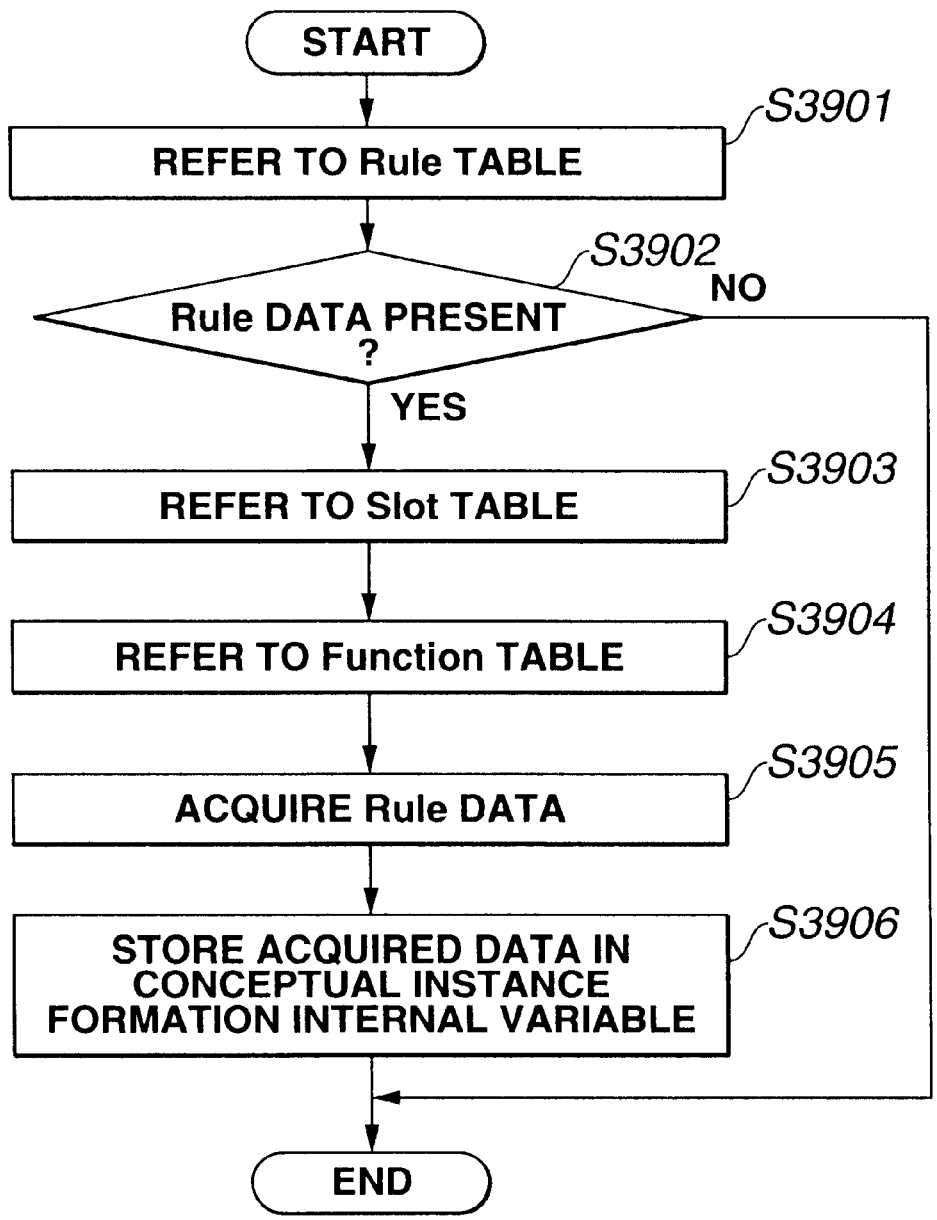
FIG. 39 is a flowchart illustrating the procedure of processing for acquiring Rule data in the conceptual-instance forming processing.

Upon start of the processing for acquiring information necessary for forming a conceptual instance, the process proceeds to step S3501, where processing for acquiring Concept data shown in FIG. 36 is started and executed. Then, in step S3502, processing for acquiring Grammar data shown in FIG. 37 is started and executed. Then, in step S3503, processing for acquiring Tense data shown in FIG. 38 is started and executed. Then, in step S3504, processing for acquiring Rule data shown in FIG. 39 is started and executed. Then, the process is terminated.

FIG. 36 is a flowchart illustrating the procedure of the processing for acquiring Concept data performed in step S3501 in the processing for acquiring information necessary for forming a conceptual instance shown in FIG. 35.

Upon start of the processing for acquiring Concept data, the process proceeds to step S3601, where the Concept table is referred to. Then, in step S3602, Concept field data is acquired. Then, in step S3603, the acquired data is stored in the concept instance forming internal variable. Then, the process is terminated.

FIG. 37 is a flowchart illustrating the procedure of the processing for acquiring Grammar data performed in step S3502 in the processing for acquiring information necessary for forming a conceptual instance shown in FIG. 35.

Upon start of the processing for acquiring Grammar data, the process proceeds to step S3701, where the Grammar table is referred to. Then, in step S3702, Grammar field data is acquired. Then, in step S3703, the acquired data is stored in the concept instance forming internal variable. Then, the process is terminated.

FIG. 38 is a flowchart illustrating the procedure of the processing for acquiring Tense data performed in step S3503 in the processing for acquiring information necessary for forming a conceptual instance shown in FIG. 35.

Upon start of the processing for acquiring Tense data, the process proceeds to step S3801, where the Tense table is referred to. Then, in step S3802, it is determined if Tense data is present. If the result of the determination in step S3802 is affirmative, the process proceeds to step S3803, where the Tensetype1 table is referred to. Then, in step S3804, the TenseType2 table is referred to. Then, in step S3805, the TenseType3 table is referred to. Then, in step S3806, the TenseType4 table is referred to. Then, in step S3807, Tense data is acquired. Then, in step S3808, the acquired data is stored in the concept instance forming internal variable. Then, the process is terminated.

FIG. 39 is a flowchart illustrating the procedure of the processing for acquiring Rule data performed in step S3504 in the processing for acquiring information necessary for forming a conceptual instance shown in FIG. 35.

Upon start of the processing for acquiring Rule data, the process proceeds to step S3901, where the Rule table is referred to. Then, in step S3902, it is determined if Rule data is present. If the result of the determination in step S3902 is affirmative, the process proceeds to step S3903, where the Slot table is referred to. Then, in step S3904, the Function table is referred to. Then, in step S3905, Rule data is acquired. Then, in step S3906, the acquired data is stored in the concept instance forming internal variable. Then, the process is terminated.

Figure 40:
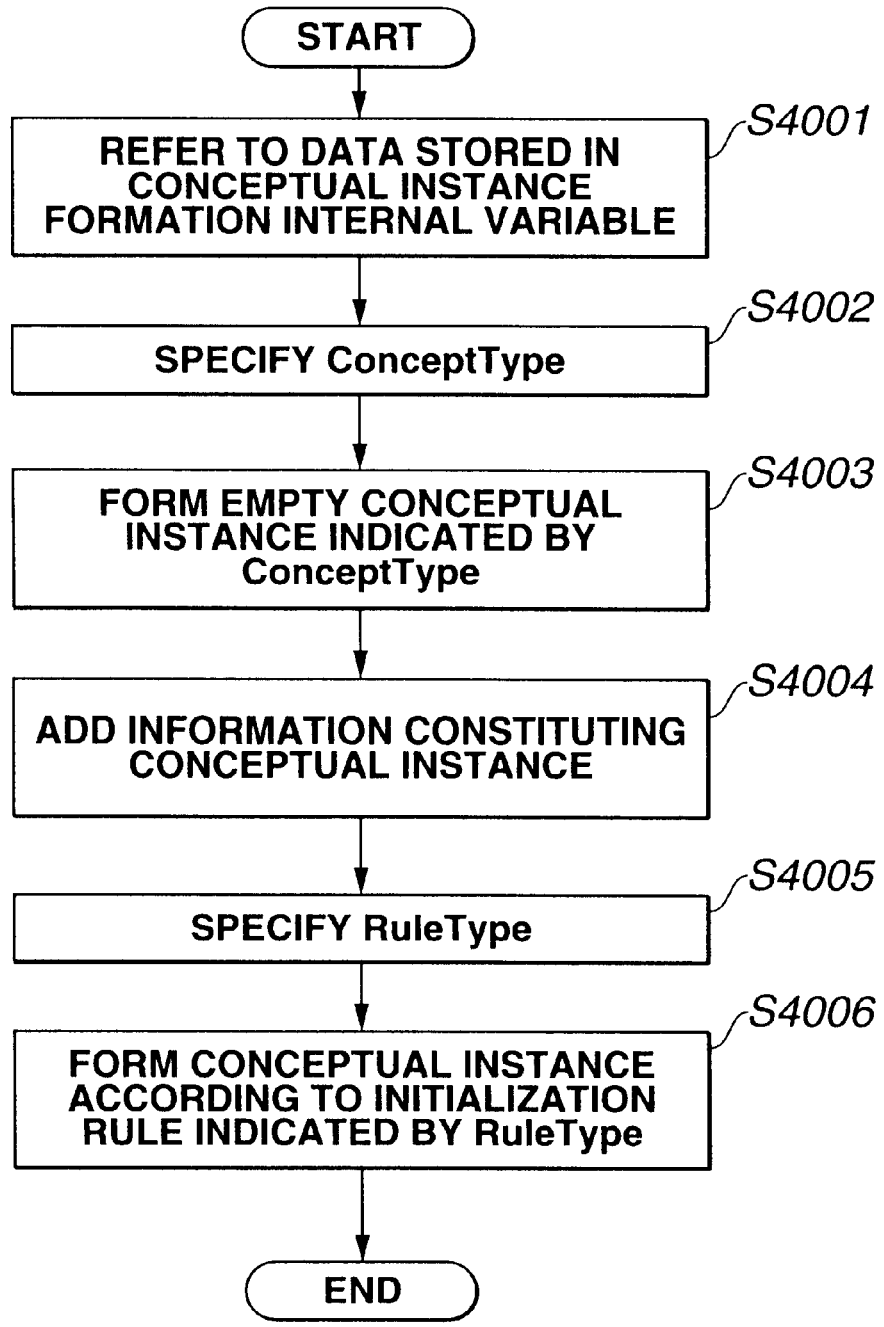
FIG. 40 is a flowchart illustrating processing for forming a conceptual instance in the retrieval processing.

FIG. 40 is a flowchart illustrating the procedure of the processing for forming a conceptual instance performed in step S707 in the retrieval processing shown in FIG. 7.

Upon start of the processing for forming a conceptual instance, the process proceeds to step S4001, where data stored in the conceptual instance formation internal variable is referred to. Then, in step S4002, a ConceptType is specified. Then, in step S4003, an empty conceptual instance indicated by the ConceptType is formed. Then, in step S4004, information constituting a conceptual instance is added. Then, in step S4005, a RuleType is specified. Then, in step S4006, a conceptual instance is formed according to the initialization rule indicated by the RuleType. Then, the process is terminated.

Figure 41:
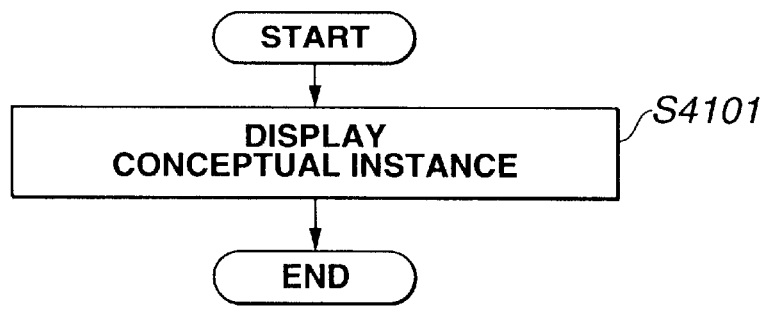
FIG. 41 is a flowchart illustrating processing for displaying a conceptual instance in retrieval processing.

FIG. 41 is a flowchart illustrating the procedure of the processing for displaying a conceptual instance performed in step S708 in the retrieval processing shown in FIG. 7.

Upon start of the processing for displaying a conceptual instance, the process proceeds to step S4101, where the conceptual instance is displayed. Then, the process is terminated.

Next, a description will be provided of processing for generating an output character string by inputting information in the information processing apparatus, with reference to the drawings.

Figure 42:
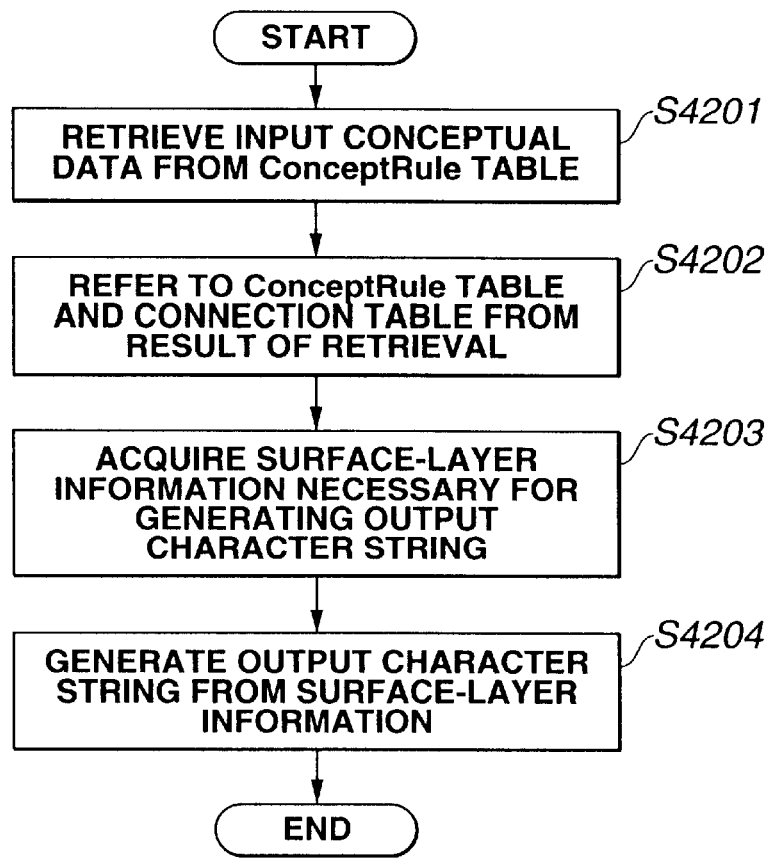
FIG. 42 is a flowchart illustrating processing for generating an output character string.

FIG. 42 is a flowchart illustrating a principal flow of processing for generating an output character string in this embodiment.

Upon start of processing for generating an output character string, the process proceeds to step S4201, where the input concept is retrieved from the ConceptRule table. Then, in step S4202, the ConceptRule table and the connection table are referred to based on the result of retrieval. Then, in step S4203, surface-layer information necessary for forming an output character string is acquired. Then, in step S4204, an output character string is generated from the acquired surface-layer information. Then, the process is terminated.

Figure 43:
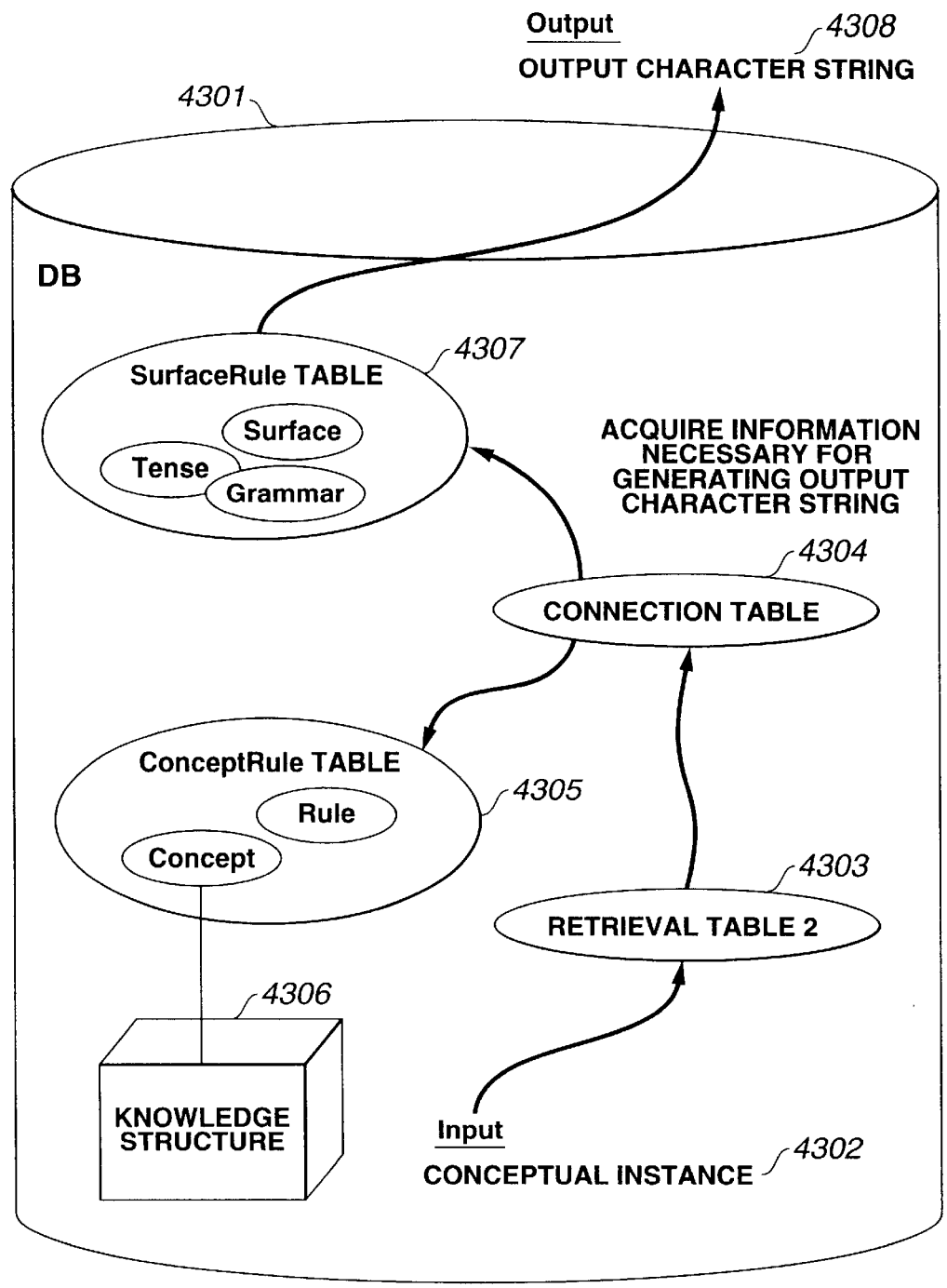
FIG. 43 is a diagram illustrating the flow of the processing for generating an output character string.

FIG. 43 is a diagram illustrating the flow of processing for generating an output character string.

From input information, Concept field data and Rule field data of a ConceptRule table 4305 are specified, and conceptual information is specified. By referring to the conceptual information and a connection table 4304, information necessary for forming a conceptual instance is acquired. By referring to this information, SurfaceRule data specifying surface-layer information is acquired, and an output character string is generated.

Figure 44:
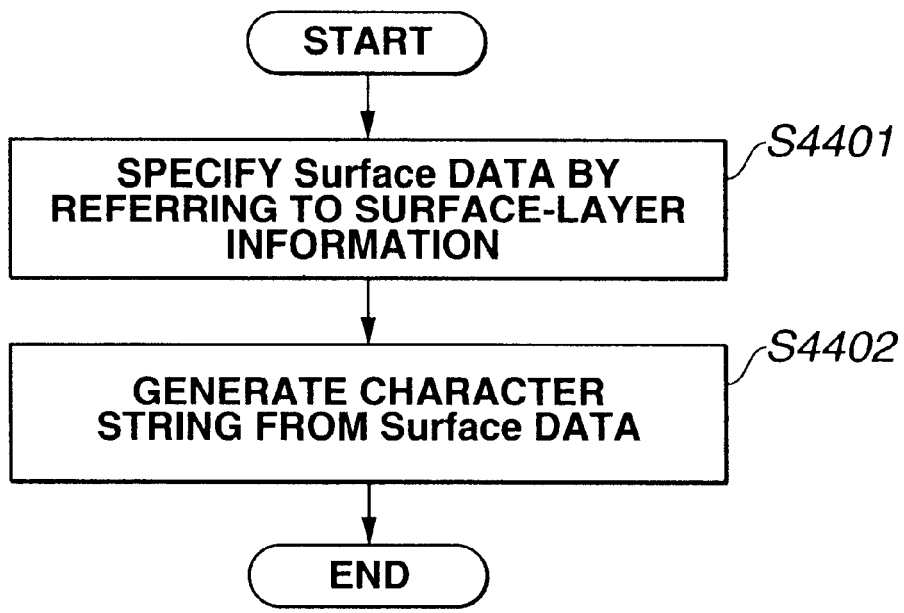
FIG. 44 is a flowchart illustrating processing for generating an output character string in the retrieval processing.

FIG. 44 is a flowchart illustrating the procedure of the processing for generating an output character string performed in step S709 in the retrieval processing shown in FIG. 7.

Upon start of the processing for generating an output character string, the process proceeds to step S4401, where Surface data is specified by referring to surface-layer information. Then, in step 4402, a character string is generated from the Surface data. Then, the process is terminated.

Figure 45:
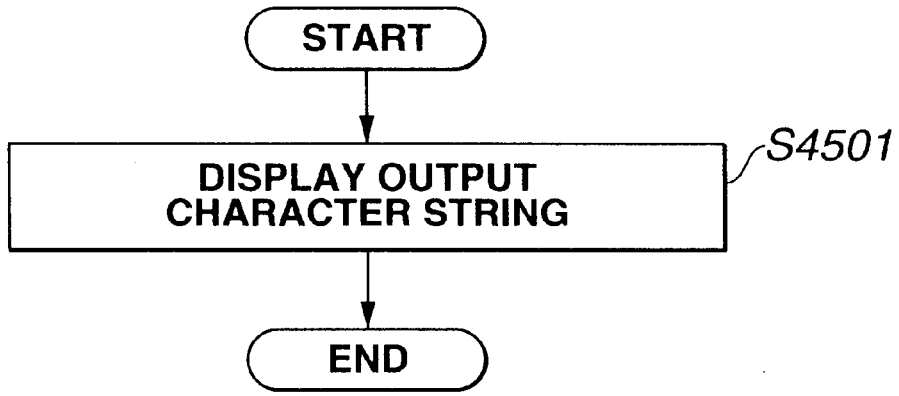
FIG. 45 is a flowchart illustrating processing for displaying an output character string in the retrieval processing.

FIG. 45 is a flowchart illustrating the procedure of the processing for displaying an output character string performed in step S710 in the retrieval processing shown in FIG. 7.

Upon start of the processing for displaying an output character string, the process proceeds to step S4501, where the output character string is displayed. Then, the process is terminated.

Next, a description will be provided of generation of a retrieval table for performing efficient retrieval from a conceptual database in the information processing apparatus, with reference to the drawings.

Figure 46:
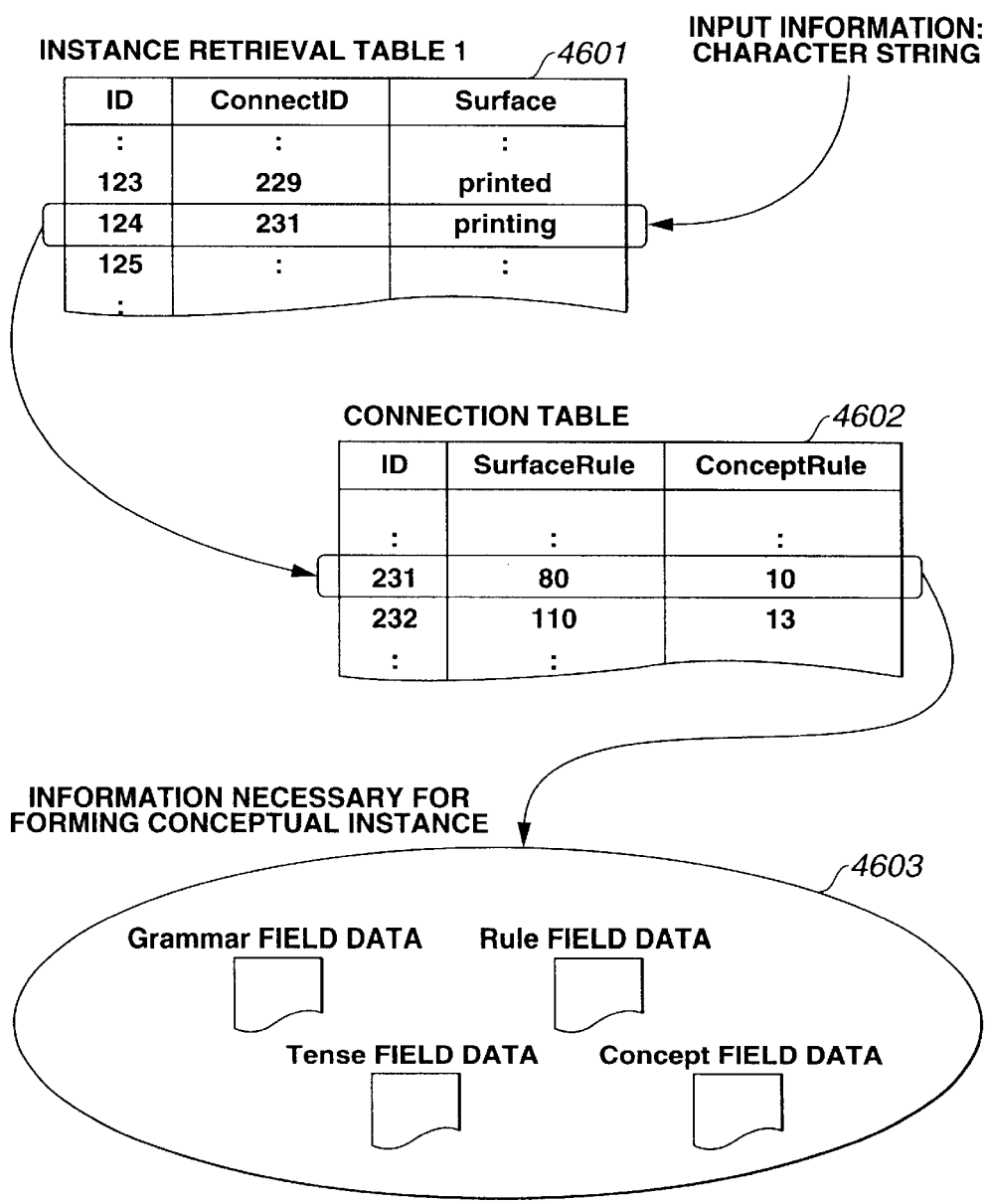
FIG. 46 is a flowchart illustrating a retrieval table 1 (by Surface) used in the retrieval processing.

FIG. 46 is a diagram illustrating an instance retrieval table 1 (by Surface) utilized when a character string is input, from among retrieval tables utilized in step S702 in the retrieval processing shown in FIG. 7.

When input information is a character string, an instance retrieval table 1 (by Surface) 4601 is started by using a Surface field as a retrieval key. By referring to a connection table 4602 from the result of retrieval, information 4603 necessary for forming a conceptual instance is transmitted.

Figure 47:
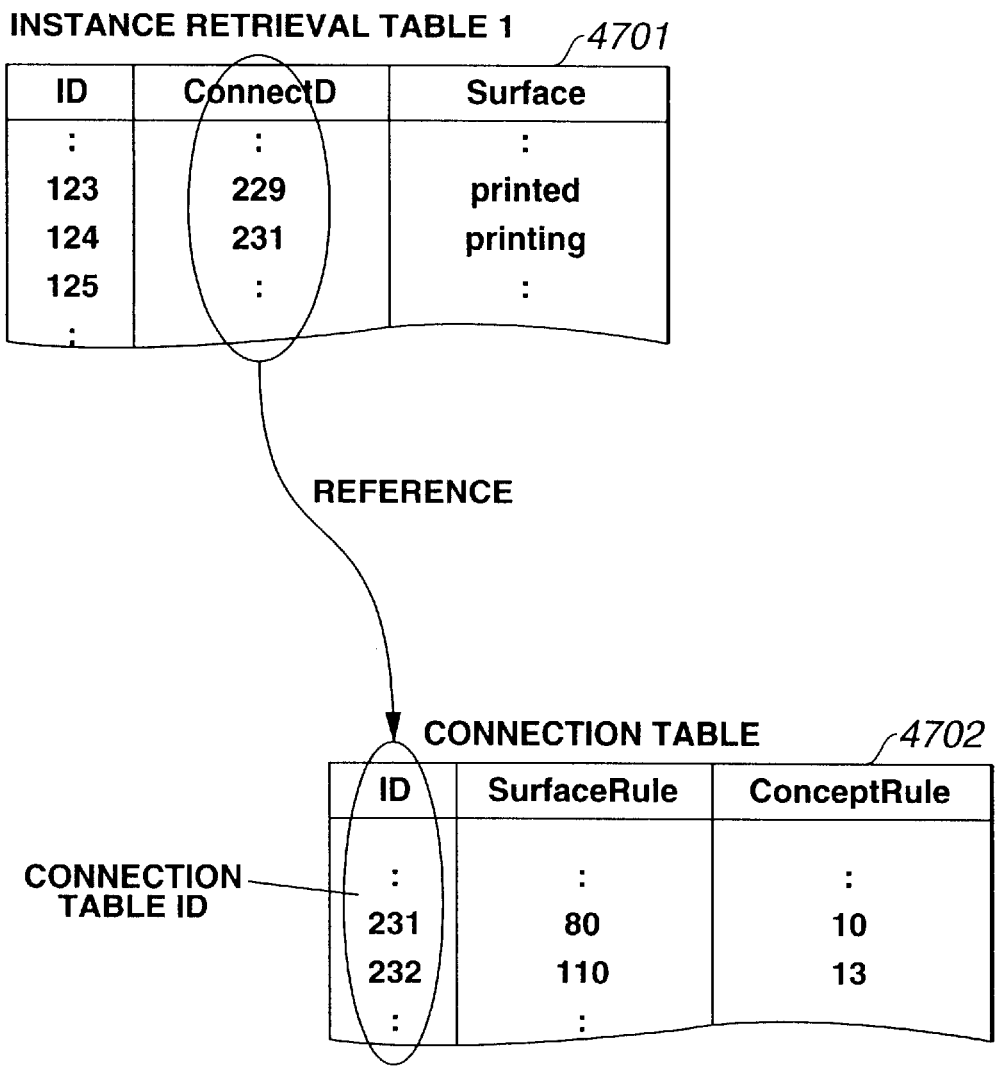
FIG. 47 is a flowchart illustrating the structure of the retrieval table 1 (by Surface) used in the retrieval processing.

FIG. 47 is a diagram illustrating the structure of the instance retrieval table 1 (by Surface) shown in FIG. 46.

An instance retrieval table 1 (by Surface) 4701 refers to a connection table 4702, and includes ConnectID data, each having a pointer to a connection table ID, and Surface data, as field data.

FIG. 48 is a diagram illustrating retrieval processing when not using the instance retrieval table 1 (by Surface) and when using the instance retrieval table 1 (by Surface).

1. When Not Using the Instance Retrieval Table 1 (by Surface)

A SurfaceRule table 4802 is referred to from a SurfaceRule table ID of a connection table 4801, and Surface field data of the SufaceRule table is sequentially collated with the input character string. In this case, since Surface field data of the SurfaceRule table is referred to from SurfaceRule data in the order of the connection table ID, a considerable amount of time is required for processing, and therefore efficient retrieval cannot be performed.

2. When Using the Instance Retrieval Table 1 (by Surface)

An input character string is retrieved from Surface field data of an instance retrieval table 1 (by Surface) 4803.

In this case, retrieval is performed from A to Z, i.e., a character string is retrieved by sequentially performing filtering starting from the first character of the character string.

For example, when a first character 'p' has been acquired, retrieval is jumped to the head of a character string starting from p in the Surface field, and the range of retrieval is specified from that position to a character string starting from q. The same processing is performed for the second and succeeding characters.

By thus limiting the range of retrieval, the processing speed of retrieval increases. In addition, since the amount of data is small because of the structure of the instance retrieval table, the speed of execution of processing increases.

Figure 49:
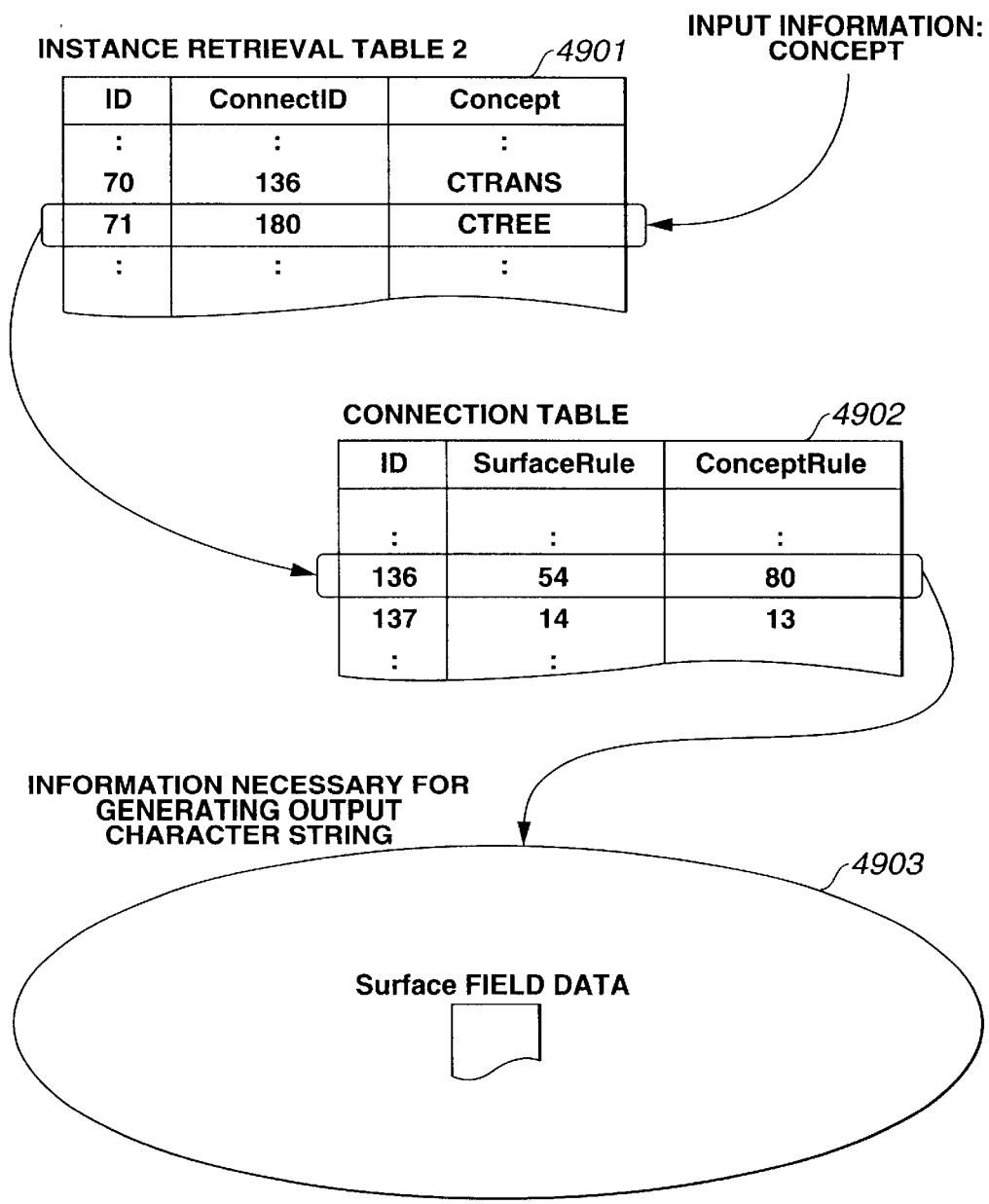
FIG. 49 is a flowchart illustrating a retrieval table 2 (by Concept) used in the retrieval processing.

FIG. 49 is a diagram illustrating an instance retrieval table 2 (by Concept) utilized when conceptual information is input, from among retrieval tables utilized in step S702 in the retrieval processing shown in FIG. 7.

When input information is a concept, an instance retrieval table 2 (by Concept) 4901 is started by using a Concept field as a retrieval key. By referring to a connection table 4902 from the result of retrieval, information 4903 necessary for generating an output character string is transmitted.

FIG. 50 is a diagram illustrating the structure of the instance retrieval table 2 (by Concept) shown in FIG. 49.

An instance retrieval table 2 (by Concept) 5001 refers to a connection table 5002 from a ConnectID field, and acquires Concept field data of the connection table 5002 as Concept field data of the instance retrieval table 2.

The instance retrieval table 2 (by Concept) 5001 refers to the connection table 5002, and includes ConnectID data, each having a pointer to a connection table ID, and Concept data, as field data.

FIG. 50 is a diagram illustrating retrieval processing when not using the instance retrieval table 2 (by Concept) and when using the instance retrieval table 2 (by Concept).

1. When Not Using the Instance Retrieval Table 2 (by Concept)

A ConceptRule table 5102 is referred to from a ConceptRule table ID of a connection table 5101, and ConceptRule field data of the ConceptRule table 5102 is sequentially collated with the input concept.

In this case, since Concept field data of the ConceptRule table is referred to from ConceptRule data in the order of the connection table ID, a considerable amount of time is required for processing, and therefore efficient retrieval cannot be performed.

2. When Using the Instance Retrieval Table 2 (by Concept)

An input concept is retrieved from Concept field data of an instance retrieval table 1 (by Concept) 5103.

In this case, retrieval is performed from A to Z, i.e., a character string is retrieved by sequentially performing filtering starting from the first character of the character string.

By thus limiting the range of retrieval, the processing speed of retrieval increases. In addition, since the amount of data is small because of the structure of the instance retrieval table, the speed of execution of processing increases.

Figure 52:
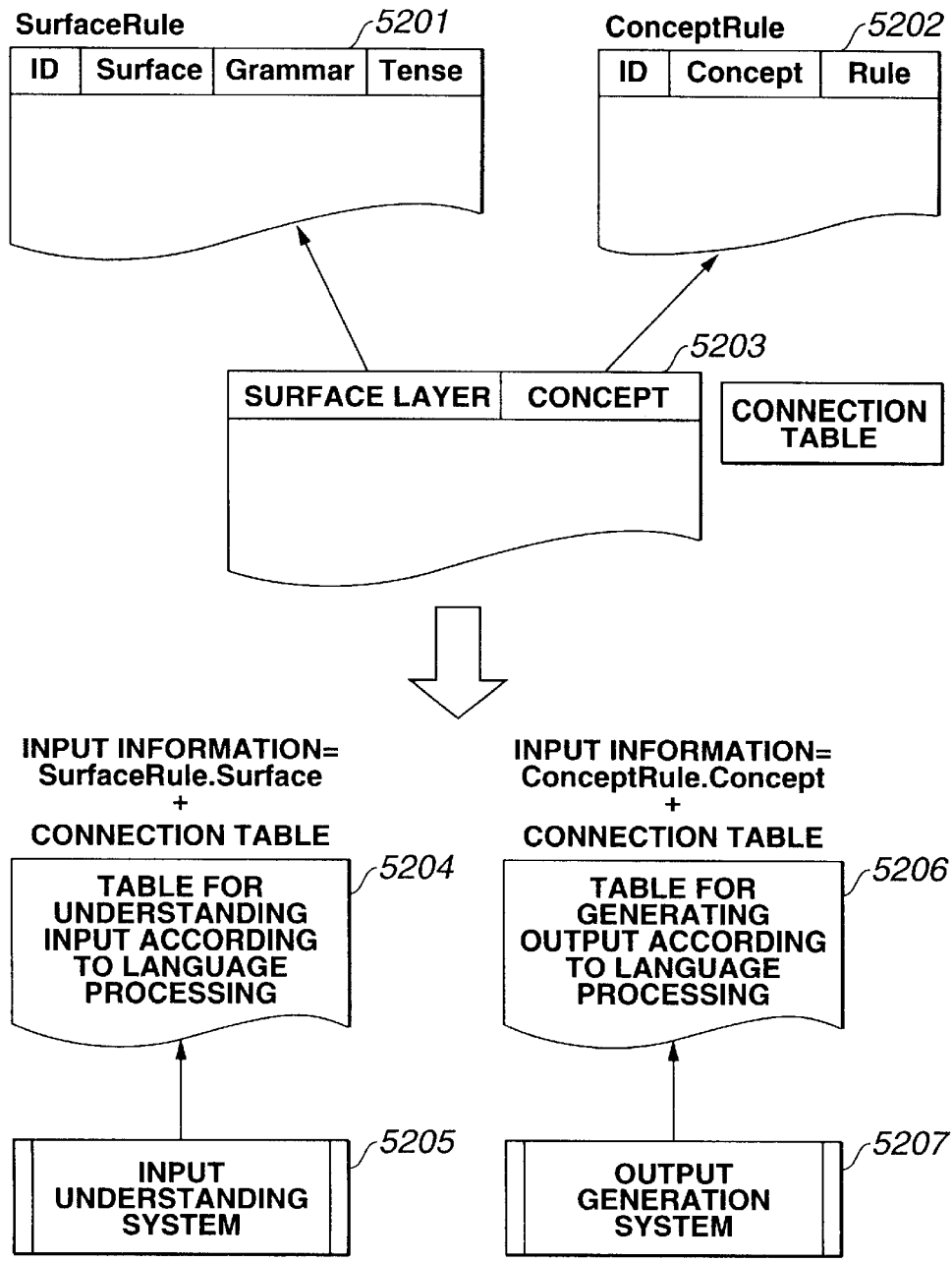
FIG. 52 is a diagram illustrating a connection table used in the retrieval processing.

FIG. 52 is a diagram illustrating a connection table.

A connection table 5203 connects surface-layer information to conceptual information. Each element of the table is information corresponding to an actually existing instance. That is, an instance is configured by surface-layer information and conceptual information.

FIG. 53 is a diagram illustrating a SurfaceRule table, a BodyString table, and a TailString table.

In another approach, input/output according to any method of representation, such as a sound, an image, a gesture or the like, other than language information mainly using text information can be processed by adding a table for each data type, and forming and utilizing a conceptual instance.

According to the above-described embodiment, by providing a database dictionary with a function of processing a natural language according to concept dependency, and forming a conceptual instance from an input character string, or by forming an output character string from a conceptual instance, it is possible to understand and precisely transmit a meaning which is closer to an original meaning.

By generating a retrieval table corresponding to input information for database having conceptual information, it is possible to specify the range of data required for retrieval, and realize efficient retrieval processing to a conceptual database. At that time, by reducing the amount of data by limiting the structure of the retrieval table to specific data, the processing speed of retrieval is further increased. Furthermore, a common knowledge base can be utilized in formation of a conceptual instance and formation of an output character string.

According to the above-described embodiment, it is possible to understand input information and generate output information without being limited to specific languages.

It is also possible to perform input/output processing according to a representation form in all domains without limiting the domain to representation of a language.

The present invention may be applied to a system comprising a plurality of apparatuses (for example, the main body of a computer, an interface apparatus, a display and the like), or to an apparatus comprising a single unit, within a range in which the functions of the above-described embodiment can be realized.

The present invention may also be applied to a case in which, in order to operate respective devices so as to realize the functions of the above-described embodiment, a computer within an apparatus or a system connected to the respective devices is supplied with program codes of software for realizing the functions of the embodiment, and the respective devices are operated by the computer (or a CPU or an MPU (microprocessor unit)) of the system or the apparatus in accordance with the supplied program. In such a case, the program codes themselves read from a storage medium realize the functions of the above-described embodiment, so that means for supplying the computer with program codes, for example, a storage medium storing the program codes, constitutes the present invention.

For example, a floppy disk, a hard disk, an optical disk, a magnetooptical disk, a CD(compact disc)-ROM, a CD-R (recordable), a magnetic tape, a nonvolatile memory card, a ROM or the like may be used as the storage medium for supplying the program codes.

The above-described program codes may, of course, be included within the scope of the present invention not only when the functions of the above-described embodiment are realized by executing the program codes read by a computer, but also when the functions of the above-described embodiment are realized by an OS (operating system) operating in a computer or in cooperation with another software, according to instructions of the program codes.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

When applying the present invention to the above-described storage medium, program codes corresponding to the above-described flowcharts may be stored in the storage medium.

The individual components designated by blocks in the drawings are all well known in the information processing apparatus and method arts and their specific construction and operation are not critical to the operation or the best mode for carrying out the invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing apparatus comprising:
    input means for inputting information containing a sequence of words;
    a conceptual database for storing information which includes;
    a surface rule table for storing a surface word in correspondence with a rule therefor;
    a concept rule table for storing a concept in correspondence with a rule therefor; and
    a connection table for storing an entry of said surface rule table in correspondence with that of said concept rule table; and
    retrieval means for retrieving information from said conceptual database based on the sequence of words input from said input means.

2. An information processing apparatus according to claim 1, further comprising conceptual-instance formation means for forming a conceptual instance based on a result by said retrieval means.

3. An information processing apparatus according to claim 2, further comprising:
    second retrieval means for retrieving information from said conceptual database based on the conceptual instance formed by said conceptual-instance formation means;
    output-character-string formation means for forming an output character string for the conceptual instance based on the result by said retrieval means; and
    output means for outputting the output character string formed by said output-character-string formation means.

4. An information processing apparatus according to claim 1, wherein the information to be input is a character string.

5. An information processing apparatus according to claim 4, wherein said retrieval means retrieves information which coincides with an input character string.

6. An information processing apparatus according to claim 1, wherein said conceptual database further includes a retrieval table storing a pointer to said concept rule table using the information to be input as a retrieval key.

7. An information processing apparatus according to claim 6, wherein said retrieval means acquires from said retrieval table the pointer to said concept rule table corresponding to the sequence of words to be input, and retrieves information necessary for forming the conceptual instance based on the pointer.

8. An information processing apparatus according to claim 1, wherein the rule for the surface word includes at least one of representation information indicating a representation, grammatical information indicating a grammatical attribute, and tense information indicating a tense.

9. An information processing apparatus according to claim 8, wherein the rule for the surface word includes all of the representation information, the grammatical information and the tense information.

10. An information processing apparatus according to claim 9, wherein the information to be input is a character string, and wherein said retrieval means retrieves information in which an input character string coincides with the representation information and which satisfies the grammatical information and the tense information.

11. An information processing apparatus according to claim 8, wherein the representation information includes invariable surface-layer information which does not change by a part of speech, a tense or the like, and variable surface-layer information which changes by a part of speech, a tense or the like.

12. An information processing apparatus according to claim 11, wherein the information to be input is a character string, and wherein said retrieval means retrieves information in which an input character string coincides with information obtained by combining the variable surface-layer information with the invariable surface-layer information.

13. An information processing apparatus according to claim 11, wherein the invariable surface-layer information includes at least one of character-string information indicating a representation, character-string-length information indicating a length of a character string, and related-variable-surface-layer information indicating related variable-surface-layer information.

14. An information processing apparatus according to claim 11, wherein the variable-surface-layer information includes at least one of change-rule information indicating a rule of change, character-string information indicating a representation, grammatical information indicating a grammatical attribute, and tense information indicating a tense.

15. An information processing apparatus according to claim 8, wherein the grammatical information includes at least one of part-of-speech-type information indicating a type of a part of speech, and a grammatical-rule information indicating a grammatical rule.

16. An information processing apparatus according to claim 8, wherein the tense information includes at least one of time information indicating present, past or future, continuation information indicating proceeding or completion, juncture information indicating start or end, and voice information indicating a passive voice or an active voice.

17. An information processing apparatus according to claim 1, wherein the rule for the concept includes at least one of slot information indicating a slot possessed by the concept, and processing information indicating a processing to be executed for the concept.

18. An information processing apparatus according to claim 17, wherein the processing information assigns processing of initializing the concept.

19. An information processing apparatus according to claim 1, further comprising conceptual-database editing means for editing said conceptual database.

20. An information processing apparatus according to claim 19, wherein said conceptual-database editing means comprises conceptual-instance display means for displaying information relating to the conceptual-instance.

21. An information processing apparatus according to claim 20, wherein said conceptual-instance display means displays at least one of a representation, a concept, a part of speech, a tense and a rule.

22. An information processing apparatus according to claim 19, wherein said conceptual-database editing means comprises conceptual-instance retrieval means for retrieving information relating to the conceptual instance.

23. An information processing apparatus according to claim 19, wherein said conceptual-database editing means comprises conceptual-instance updating means for updating the information relating to the conceptual instance.

24. An information processing apparatus according to claim 19, wherein said conceptual-database editing means comprises conceptual-instance deletion means for deleting the information relating to the conceptual instance.

25. An information processing apparatus according to claim 19, wherein said conceptual-database editing means comprises conceptual-instance addition means for adding information relating to the conceptual instance.

26. An information processing apparatus according to claim 19, wherein said conceptual-database editing means comprises cancel means for canceling an operation.

27. An information processing apparatus according to claim 1, further comprising generation means for generating a table to be processed by referring to said conceptual database.

28. An information processing apparatus according to claim 27, wherein said conceptual database includes a retrieval table corresponding to input information, a table for referring to information necessary for forming the conceptual instance, and a table for referring to information necessary for forming an output character string.

29. An information processing method comprising:
a input step of inputting a sequence of words; and
a retrieval step of retrieving information from a conceptual database for storing information which includes a surface rule table for storing a surface word in correspondence with a rule therefor, a concept rule table for storing a concept in correspondence with a rule therefor, and a connection table for storing an entry of said surface rule table in correspondence with that of said concept rule table, based on the sequence of words input from said input step.

30. An information processing method according to claim 29, further comprising a conceptual-instance formation step of forming a conceptual instance based on a result in said retrieval step.

31. An information processing method according to claim 30, further comprising:
a second retrieval step for retrieving information from said conceptual database based on the conceptual instance formed by said conceptual-instance formation step;
an output-character-string formation step of forming an output character string for the conceptual instance based on the result in said retrieval step; and
an output step of outputting the output character string formed in said output-character-string formation step.

32. An information processing method according to claim 29, wherein the information to be input is a character string.

33. An information processing method according to claim 32, wherein in said retrieval step, information which coincides with an input character string is retrieved.

34. An information processing method according to claim 29, wherein the conceptual database further includes a retrieval table storing a pointer to the concept rule table using the information to be input as a retrieval key.

35. An information processing method according to claim 34, wherein in said retrieval step, the pointer to the concept rule table corresponding to the sequence of words to be input is acquired from the retrieval table, and retrieves information necessary for forming the conceptual instance is retrieved from the concept rule table based on the pointer.

36. An information processing method according to claim 29, wherein the rule for the surface word includes at least one of representation information indicating a representation, grammatical information indicating a grammatical attribute, and tense information indicating a tense.

37. An information processing method according to claim 36, wherein the rule for the surface word includes all of the representation information, the grammatical information and the tense information.

38. An information processing method according to claim 37, wherein the information to be input is a character string, and wherein in said retrieval step, information in which an input character string coincides with the representation information and which satisfies the grammatical information and the tense information is retrieved.

39. An information processing method according to claim 36, wherein the representation information includes invariable surface-layer information which does not change by a part of speech, a tense or the like, and variable surface-layer information which changes by a part of speech, a tense or the like.

40. An information processing method according to claim 39, wherein the information to be input is a character string, and wherein in said retrieval step, information in which an input character string coincides with information obtained by combining the variable surface-layer information with the invariable surface-layer information is retrieved.

41. An information processing method according to claim 39, wherein the invariable surface-layer information includes at least one of character-string information indicating a representation, character-string-length information indicating a length of a character string, and related-variable-surface-layer information indicating related variable-surface-layer information.

42. An information processing method according to claim 39, wherein the variable-surface-layer information includes at least one of change-rule information indicating a rule of change, character-string information indicating a representation, grammatical information indicating a grammatical attribute, and tense information indicating a tense.

43. An information processing method according to claim 36, wherein the grammatical information includes at least one of part-of-speech-type information indicating a type of a part of speech, and a grammatical-rule information indicating a grammatical rule.

44. An information processing method according to claim 36, wherein the tense information includes at least one of time information indicating present, past or future, continuation information indicating proceeding or completion, juncture information indicating start or end, and voice information indicating a passive voice or an active voice.

45. An information processing method according to claim 29, wherein the rule for the concept includes at least one of slot information indicating a slot possessed by the concept, and processing information indicating processing to be executed for the concept.

46. An information processing method according to claim 45, wherein the processing information assigns processing of initializing the concept.

47. An information processing method according to claim 29, further comprising a conceptual-database editing step of editing the conceptual database.

48. An information processing method according to claim 47, wherein said conceptual-database editing step comprises a conceptual-instance display step of displaying information relating to the conceptual instance.

49. An information processing method according to claim 48, wherein in said conceptual-instance display step, at least one of a representation, a concept, a part of speech, a tense and a rule is displayed.

50. An information processing method according to claim 47, wherein said conceptual-database editing step comprises a conceptual-instance retrieval step of retrieving information relating to the conceptual instance.

51. An information processing method according to claim 47, wherein said conceptual-database editing step comprises a conceptual-instance updating step of updating the information relating to the conceptual instance.

52. An information processing method according to claim 47, wherein said conceptual-database editing step comprises a conceptual-instance deletion step of deleting the information relating to the conceptual instance.

53. An information processing method according to claim 47, wherein said conceptual-database editing step comprises a conceptual-instance addition step of adding information relating to the conceptual instance.

54. An information processing method according to claim 47, wherein said conceptual-database editing step comprises a cancel step of canceling an operation.

55. An information processing method according to claim 29, further comprising a generation step of generating a table to be processed by referring to the conceptual database.

56. An information processing method according to claim 55, wherein the conceptual database includes a retrieval table corresponding to input information, a table for referring to information necessary for forming the conceptual instance, and a table for referring to information necessary for forming an output character string.

57. A computer-readable program for controlling a computer to perform information processing, said program comprising codes for causing the computer to perform:

an input step of inputting a sequence of words; and a retrieval step of retrieving information from a conceptual database for storing information which includes a surface rule table for storing a surface word in correspondence with a rule therefor, a concept rule table for storing a concept in correspondence with a rule therefor, and a connection table for storing an entry of said surface rule table in correspondence with that of said concept rule table, based on the sequence of words input in said input step.

* * * * *

UNITED STATES PATENT AND TRADEMARK OFFICE
CERTIFICATE OF CORRECTION

PATENT NO. : 6,768,990 B2  Page 1 of 1
DATED : July 27, 2004
INVENTOR(S) : Wakai et al.

Figure 51:
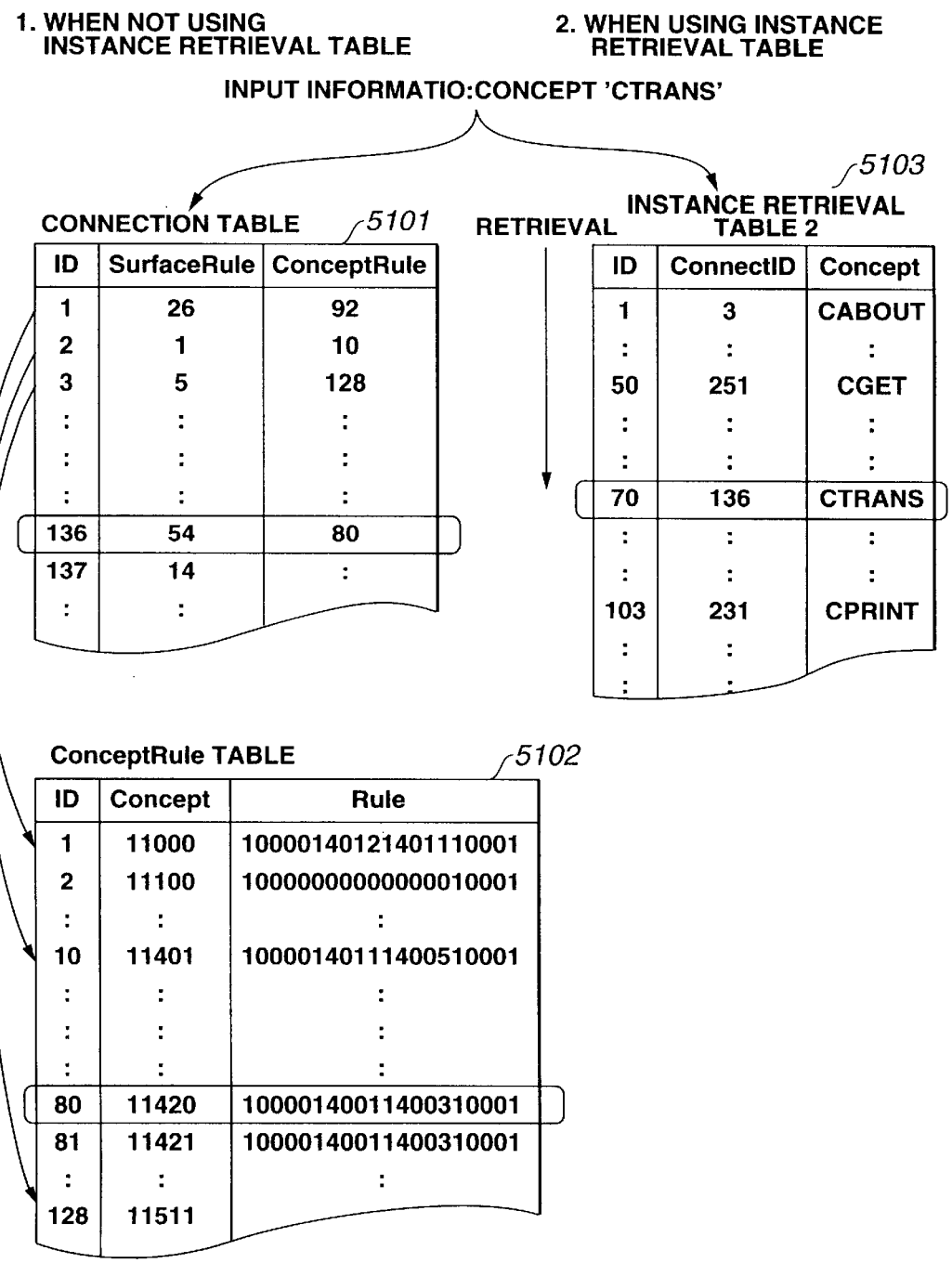
FIG. 51 is a diagram illustrating the difference in the retrieval processing between when using the retrieval table 2 (by Concept) and when not using the retrieval table 2 (by Concept) in the retrieval processing.

It is certified that error appears in the above-identified patent and that said Letters Patent is hereby corrected as shown below:

Drawings,
Sheet 10, Figure 12, "inmobile" should read -- immobile --.
Sheet 11, Figure 13, four occurrences, "'(brank)'" should read -- '(blank)' --; and "Fillein" should read -- Filled in --.
Sheet 36, Figure 47, "ConnectD" should read -- ConnectID --.
Sheet 37, Figure 48, "INPUT INFORMATIO:" should read -- INPUT INFORMATION: --.
Sheet 40, Figure 51, "INPUT INFORMATIO:" should read -- INPUT INFORMATION: --.

Column 6,
Line 36, "sentenced" should read -- sentence --.

Signed and Sealed this

Seventh Day of March, 2006

JON W. DUDAS
*Director of the United States Patent and Trademark Office*